US009213965B1

(12) United States Patent
Brooks et al.

(10) Patent No.: US 9,213,965 B1
(45) Date of Patent: Dec. 15, 2015

(54) MACHINE, METHODS, AND PROGRAM PRODUCT FOR ELECTRONIC INVENTORY TRACKING

(75) Inventors: Jason Brooks, Atlanta, GA (US); Mike Wells, Flowery Branch, GA (US)

(73) Assignee: METABANK, Sioux Falls, SD (US)

( * ) Notice: Subject to any disclaimer, the term of this patent is extended or adjusted under 35 U.S.C. 154(b) by 257 days.

(21) Appl. No.: 12/626,349

(22) Filed: Nov. 25, 2009

Related U.S. Application Data

(60) Provisional application No. 61/118,127, filed on Nov. 26, 2008.

(51) Int. Cl.
G06Q 30/00 (2012.01)
G06Q 10/00 (2012.01)
A01K 5/02 (2006.01)
G06F 17/50 (2006.01)
G06Q 20/00 (2012.01)
G06Q 20/08 (2012.01)

(52) U.S. Cl.
CPC .................... G06Q 20/085 (2013.01)

(58) Field of Classification Search
None
See application file for complete search history.

(56) References Cited

U.S. PATENT DOCUMENTS

| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzaff et al. |

(Continued)

FOREIGN PATENT DOCUMENTS

| EP | 0348932 | 1/1990 |
| EP | 0397512 | 11/1990 |

(Continued)

OTHER PUBLICATIONS

Orszag, Peter, "Unemployment Insurance as an Economic Stimulus", Center for Budget and Policy Priorities, Nov. 15, 2011.

(Continued)

*Primary Examiner* — Peter L Ludwig
(74) *Attorney, Agent, or Firm* — Bracewell & Giuliani LLP

(57) ABSTRACT

Machine, methods, and program product for facilitating electronic inventory tracking and management of products through messaging over a payment network, are provided. An example includes an inventory management computer in communication with a merchant POS apparatus or terminal over an existing financial services payment network and configured to receive and process purchase transaction data associated with a product being purchased, for use by a product provider. The computer can include electronic inventory management program product configured to perform various operations including receiving a purchase transaction message sent through the payment network, storing purchase transaction data, and notifying a product provider of the purchase transaction data. The purchase transaction message can include a financial services electronic payment network compatible universal product-transaction identifier, which can be received through the POS terminal in response to a consumer or merchant interfacing the product's container, or an associated purchase ticket or slip storing the transaction identifier, with the POS terminal.

5 Claims, 12 Drawing Sheets

(56) References Cited

U.S. PATENT DOCUMENTS

| | | | |
|---|---|---|---|
| 4,625,276 A | 11/1986 | Benton et al. | |
| 4,677,565 A | 6/1987 | Ogaki et al. | |
| 4,678,895 A | 7/1987 | Tateisi et al. | |
| 4,706,275 A | 11/1987 | Kamal | |
| 4,722,054 A | 1/1988 | Yorozu et al. | |
| 4,727,243 A | 2/1988 | Saver | |
| 4,750,201 A | 6/1988 | Hodgson et al. | |
| 4,797,540 A | 1/1989 | Kimizu | |
| 4,827,113 A | 5/1989 | Rikuna | |
| 4,868,900 A | 9/1989 | McGuire | |
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A | 11/1990 | Dethloff et al. | |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,151,582 A | 9/1992 | Fujioka | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanärä et al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schilling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,465,206 A | 11/1995 | Hilt et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,112 A | 11/1996 | Cambray et al. | |
| 5,577,121 A | 11/1996 | Davis et al. | |
| 5,661,254 A | 8/1997 | Steuer et al. | |
| 5,696,908 A | 12/1997 | Muehlberger et al. | |
| 5,699,528 A * | 12/1997 | Hogan | 705/40 |
| 5,732,136 A | 3/1998 | Murphree et al. | |
| 5,814,798 A | 9/1998 | Zancho | |
| 5,841,365 A * | 11/1998 | Rimkus | 340/5.61 |
| 5,859,419 A | 1/1999 | Wynn | |
| 5,870,721 A | 2/1999 | Norris | |
| 5,875,437 A | 2/1999 | Atkins | |
| 5,878,141 A | 3/1999 | Daly et al. | |
| 5,893,907 A | 4/1999 | Ukuda | |
| 5,897,620 A | 4/1999 | Walker et al. | |
| 5,920,848 A | 7/1999 | Schutzer et al. | |
| 5,923,016 A | 7/1999 | Fredregill et al. | |
| 5,933,812 A | 8/1999 | Meyer et al. | |
| 5,963,921 A | 10/1999 | Longfield | |
| 6,000,608 A * | 12/1999 | Dorf | 235/380 |
| 6,012,635 A | 1/2000 | Shimada et al. | |
| 6,021,397 A | 2/2000 | Jones et al. | |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A | 11/2000 | Walker et al. | |
| 6,154,738 A * | 11/2000 | Call | 705/20 |
| 6,189,787 B1 | 2/2001 | Dorf | |
| 6,208,978 B1 | 3/2001 | Walker et al. | |
| 6,249,773 B1 * | 6/2001 | Allard et al. | 705/26.8 |
| 6,253,998 B1 | 7/2001 | Ziamo | |
| 6,304,860 B1 | 10/2001 | Martin et al. | |
| 6,315,193 B1 | 11/2001 | Hogan | |
| 6,450,407 B1 | 9/2002 | Freeman et al. | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,793,131 B2 | 9/2004 | Hogan | |
| 6,865,544 B1 | 3/2005 | Austin | |
| 6,920,434 B1 | 7/2005 | Cossette | |
| 6,999,943 B1 | 2/2006 | Johnson et al. | |
| 7,010,507 B1 | 3/2006 | Anderson et al. | |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 | 2/2007 | Wilson et al. | |
| 7,206,761 B2 | 4/2007 | Colvin | |
| 7,252,223 B2 | 8/2007 | Schofield | |
| 7,258,273 B2 | 8/2007 | Griffin | |
| 7,370,076 B2 | 5/2008 | Friedman et al. | |
| 7,392,224 B1 | 6/2008 | Bauer et al. | |
| 7,398,919 B2 | 7/2008 | Cooper | |
| 7,426,492 B1 | 9/2008 | Bishop et al. | |
| 7,451,920 B1 | 11/2008 | Rose | |
| 7,472,089 B2 | 12/2008 | Hu et al. | |
| 7,493,279 B1 | 2/2009 | Kwan | |
| 7,509,286 B1 | 3/2009 | Bent et al. | |
| 7,546,945 B1 | 6/2009 | Bucci et al. | |
| 7,567,936 B1 | 7/2009 | Peckover et al. | |
| 7,599,879 B2 | 10/2009 | Louie et al. | |
| 7,606,918 B2 | 10/2009 | Holzman et al. | |
| 7,607,570 B1 | 10/2009 | Constantine | |
| 7,628,319 B2 * | 12/2009 | Brown et al. | 235/375 |
| 7,653,591 B1 | 1/2010 | Dabney | |
| 7,702,583 B1 | 4/2010 | Hamilton et al. | |
| 7,702,587 B2 | 4/2010 | Nguyen et al. | |
| 7,752,102 B2 | 7/2010 | Thomas | |
| 7,757,944 B2 | 7/2010 | Cline et al. | |
| 7,783,571 B2 | 8/2010 | Fish et al. | |
| 7,792,717 B1 | 9/2010 | Hankins et al. | |
| 7,810,735 B2 | 10/2010 | Madani | |
| 7,813,955 B2 * | 10/2010 | Ariff et al. | 705/14.28 |
| 7,814,012 B2 | 10/2010 | Johnson | |
| 7,856,399 B2 * | 12/2010 | Wilkes | 705/39 |
| 7,865,434 B2 | 1/2011 | Sheets | |
| 7,873,569 B1 | 1/2011 | Cahn | |
| 7,899,750 B1 | 3/2011 | Klieman et al. | |
| 7,904,333 B1 * | 3/2011 | Perkowski | 705/14.4 |
| 7,933,833 B2 | 4/2011 | Hotz et al. | |
| 7,954,704 B1 | 6/2011 | Gephart et al. | |
| 8,024,242 B2 | 9/2011 | Galit | |
| 8,046,256 B2 * | 10/2011 | Chien et al. | 705/14.33 |
| 8,051,006 B1 | 11/2011 | Rourk | |
| 8,055,557 B2 | 11/2011 | Sorbe et al. | |
| 8,065,187 B2 | 11/2011 | Ahlers et al. | |
| 8,069,085 B2 | 11/2011 | Ahlers et al. | |
| 8,086,494 B2 | 12/2011 | Dooley et al. | |
| 8,090,649 B2 | 1/2012 | Galit et al. | |
| 8,103,549 B1 | 1/2012 | Ahlers et al. | |
| 8,108,272 B2 | 1/2012 | Sorbe et al. | |
| 8,108,279 B2 | 1/2012 | Galit et al. | |
| 8,108,977 B1 | 2/2012 | Miller | |
| 8,150,764 B2 | 4/2012 | Crowe et al. | |
| 8,175,962 B2 | 5/2012 | Galit et al. | |
| 8,175,972 B2 | 5/2012 | Galit et al. | |
| 8,190,480 B1 | 5/2012 | Ahlers et al. | |
| 8,214,286 B1 | 7/2012 | Galit et al. | |
| 8,244,611 B2 | 8/2012 | Galit | |
| 8,244,637 B2 | 8/2012 | Galit et al. | |
| 8,260,678 B2 | 9/2012 | Miller | |
| 8,266,047 B2 | 9/2012 | Galit | |

(56) References Cited

U.S. PATENT DOCUMENTS

| | | |
|---|---|---|
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,589,295 B2 | 11/2013 | Sorbe et al. |
| 2001/0021925 A1 | 9/2001 | Ukigawa et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1* | 1/2003 | Risafi et al. .................. 235/380 |
| 2003/0004997 A1 | 1/2003 | Parker et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0199463 A1 | 10/2004 | Deggendorf |
| 2004/0210484 A1 | 10/2004 | Lee |
| 2004/0211830 A1* | 10/2004 | Algiene .................. 235/379 |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2004/0249752 A1 | 12/2004 | Prato et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0071230 A1 | 3/2005 | Mankoff |
| 2005/0075939 A1 | 4/2005 | Bao et al. |
| 2005/0077350 A1 | 4/2005 | Courtion et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Allgiene |
| 2005/0228724 A1 | 10/2005 | Frangiosa |
| 2005/0273430 A1 | 12/2005 | Pliha |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0054682 A1 | 3/2006 | De La Huerga |
| 2006/0059085 A1 | 3/2006 | Tucker |
| 2006/0074804 A1 | 4/2006 | Cinar |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1* | 7/2006 | Nguyen et al. .................. 705/39 |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0247975 A1 | 11/2006 | Shapiro et al. |
| 2006/0249570 A1 | 11/2006 | Seifert et al. |
| 2006/0249870 A1* | 11/2006 | Tachauer .................. 264/167 |
| 2006/0259364 A1 | 11/2006 | Strock et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley et al. |
| 2008/0052189 A1* | 2/2008 | Walker et al. .................. 705/26 |
| 2008/0052224 A1 | 2/2008 | Parker |
| 2008/0059363 A1 | 3/2008 | Hotz et al. |
| 2008/0065532 A1 | 3/2008 | De la Motte |
| 2008/0091519 A1 | 4/2008 | Foss |
| 2008/0103968 A1 | 5/2008 | Bies et al. |

(56) References Cited

U.S. PATENT DOCUMENTS

| | | | |
|---|---|---|---|
| 2008/0103970 A1 | 5/2008 | Books | |
| 2008/0120129 A1 | 5/2008 | Seubert et al. | |
| 2008/0140561 A1 | 6/2008 | Neel | |
| 2008/0140568 A1 | 6/2008 | Henry | |
| 2008/0140576 A1 | 6/2008 | Lewis et al. | |
| 2008/0162271 A1 | 7/2008 | Benjamin | |
| 2008/0162337 A1 | 7/2008 | Greenland et al. | |
| 2008/0210753 A1 | 9/2008 | Plozay et al. | |
| 2008/0228643 A1 | 9/2008 | Hall | |
| 2008/0235095 A1 | 9/2008 | Oles et al. | |
| 2008/0270298 A1 | 10/2008 | McElroy et al. | |
| 2008/0281734 A1 | 11/2008 | Longe et al. | |
| 2008/0294977 A1 | 11/2008 | Friedman et al. | |
| 2008/0301162 A1 | 12/2008 | Wall et al. | |
| 2009/0006203 A1* | 1/2009 | Fordyce et al. | 705/14 |
| 2009/0048963 A1 | 2/2009 | Bishop et al. | |
| 2009/0061929 A1* | 3/2009 | Evans | 455/556.1 |
| 2009/0063297 A1 | 3/2009 | Dooley et al. | |
| 2009/0063342 A1 | 3/2009 | Beckers | |
| 2009/0063351 A1 | 3/2009 | Schmeyer et al. | |
| 2009/0078757 A1* | 3/2009 | Hanson et al. | 235/380 |
| 2009/0094125 A1 | 4/2009 | Killian et al. | |
| 2009/0157220 A1* | 6/2009 | Walker et al. | 700/232 |
| 2009/0164351 A1 | 6/2009 | Sorbe et al. | |
| 2009/0164362 A1 | 6/2009 | Moore | |
| 2009/0164363 A1 | 6/2009 | Ahlers | |
| 2009/0171775 A1 | 7/2009 | Cashion et al. | |
| 2009/0192934 A1 | 7/2009 | Chu et al. | |
| 2009/0222367 A1 | 9/2009 | Jenkins et al. | |
| 2009/0228307 A1 | 9/2009 | Sorbe | |
| 2009/0254431 A1 | 10/2009 | Crowe et al. | |
| 2009/0265241 A1 | 10/2009 | Bishop et al. | |
| 2010/0030687 A1 | 2/2010 | Panthaki et al. | |
| 2010/0057554 A1* | 3/2010 | Lanford | 705/14.38 |
| 2010/0057609 A1 | 3/2010 | Sibson | |
| 2010/0076836 A1* | 3/2010 | Giordano et al. | 705/14.38 |
| 2010/0076875 A1 | 3/2010 | Ernst et al. | |
| 2010/0106555 A1* | 4/2010 | Mneimneh et al. | 705/10 |
| 2010/0222132 A1 | 9/2010 | Sanford et al. | |
| 2010/0280949 A1 | 11/2010 | Van Rensburg | |
| 2010/0306104 A1* | 12/2010 | Johnson | 705/40 |
| 2010/0312684 A1 | 12/2010 | Kemper et al. | |
| 2011/0047039 A1 | 2/2011 | Crames et al. | |
| 2011/0093323 A1 | 4/2011 | Prus et al. | |
| 2011/0106698 A1 | 5/2011 | Isaacson et al. | |
| 2011/0112957 A1 | 5/2011 | Ingram et al. | |
| 2011/0270664 A1 | 11/2011 | Jones | |
| 2012/0271697 A1 | 10/2012 | Gilman et al. | |
| 2013/0124429 A1 | 5/2013 | Zou et al. | |
| 2013/0173407 A1 | 7/2013 | Killian et al. | |
| 2014/0032381 A1 | 1/2014 | Killian et al. | |

FOREIGN PATENT DOCUMENTS

| | | |
|---|---|---|
| EP | 0397512 A2 | 11/1990 |
| EP | 0619565 | 10/1994 |
| EP | 0619565 A1 | 10/1994 |
| EP | 0348932 A2 | 5/1995 |
| JP | 2-238593 | 9/1990 |
| JP | 2-238593 A | 9/1990 |
| JP | 2-278495 | 11/1990 |
| JP | 2-278495 A | 11/1990 |
| JP | 3-100791 | 4/1991 |
| JP | 3-100791 A | 4/1991 |
| JP | 4-165588 | 6/1992 |
| JP | 4-165588 A | 6/1992 |
| KR | 2010010217 | 2/2010 |
| WO | WO 86/02757 A1 | 5/1986 |
| WO | WO8602757 | 5/1986 |
| WO | WO 86/07647 A1 | 12/1986 |
| WO | WO8607647 | 12/1986 |
| WO | WO 88/03297 A1 | 5/1988 |
| WO | WO8803297 | 5/1988 |
| WO | WO 89/08899 A1 | 9/1989 |
| WO | WO8908899 | 9/1989 |
| WO | WO 91/09370 A1 | 6/1991 |
| WO | WO9109370 | 6/1991 |
| WO | WO 93/09515 A1 | 5/1993 |
| WO | WO9309515 | 5/1993 |
| WO | WO 94/10649 A1 | 5/1994 |
| WO | WO9410649 | 5/1994 |
| WO | WO 94/28498 A1 | 12/1994 |
| WO | WO9428498 | 12/1994 |
| WO | WO 95/03570 A2 | 2/1995 |
| WO | WO9503570 | 2/1995 |
| WO | WO 97/46986 A1 | 12/1997 |
| WO | WO9746986 | 12/1997 |
| WO | WO0060487 | 10/2000 |
| WO | WO2007133315 A2 | 11/2007 |
| WO | 2008102329 A2 | 8/2008 |
| ZA | 200709282 | 10/2007 |

OTHER PUBLICATIONS

Powell, Robert L., "Statewide Electronic Commerce Program Status Report", State of North Carolina Office of the State Controller, Mar. 7, 2007.

Parrott, James, "Jittery Wall Street, Calm City?", Gotham Gazette, Apr. 16, 2007.

Zandi, Mark, "Washington Throws the Economy a Rope", Moody's Economy.com, Jan. 22, 2008.

Blair, Christine E., et al., "Challenges to the Dual Banking System: The Funding of Bank Supervision", FDIC Bank Review, Mar. 31, 2006.

Office Action for co-pending U.S. Appl. No. 12/367,187 dated Jun. 27, 2011.

"Developing Asia and the World", Asian Development Bank 2002.

Office action from co-pending U.S. Appl. No. 12/338,497 dated Aug. 18, 2011.

Notice of Allowance of co-pending U.S. Appl. No. 12/417,199 dated Aug. 18, 2011.

Notice of Allowance of co-pending U.S. Appl. No. 12/417,211 dated Aug. 22, 2011.

Wolfe, Daniel, "An E-Variation on Payday Loan Theme", American Banker, Jul. 28, 2005 (cited in Notice of Allowance).

"Letter of Credit Explained: What is Letter of Credit?", Dec. 26, 2005, pp. 1-2 (cited in Office Action from co-pending U.S. Appl. No. 12/338,540 dated Sep. 1, 2011).

Office Action from co-pending U.S. Appl. No. 12/338,540 dated Sep. 1, 2011.

Notice of Allowance of co-pending U.S. Appl. No. 12/338,365 dated Sep. 1, 2011.

Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.

Final Office Action in co-pending U.S. Appl. No. 12/338,584 dated Sep. 15, 2011.

Final Office Action in co-pending U.S. Appl. No. 12/338,684 dated Sep. 23, 2011.

Lazarus, David, "120% rate for Wells' Advances", Oct. 16, 2004, San Francisco Chronicle (cited in Final Office Action in co-pending U.S. Appl. No. 12/338,684 dated Sep. 23, 2011).

Office Action in co-pending U.S. Appl. No. 12/397,113 dated Sep. 30, 2011.

Notice of Allowance in co-pending U.S. Appl. No. 12/338,645 dated Oct. 3, 2011.

Office Action in co-pending U.S. Appl. No. 12/417,182 dated Sep. 28, 2011.

Office Action in co-pending U.S. Appl. No. 12/609,896 dated Apr. 5, 2011.

Office Action in co-pending U.S. Appl. No. 12/417,162 dated Apr. 13, 2011.

Notice of Allowance in co-pending U.S. Appl. No. 12/554,659 dated Aug. 2, 2011.

Office Action in co-pending U.S. Appl. No. 12/338,712 dated Jul. 28, 2011.

(56) References Cited

OTHER PUBLICATIONS

Office Action in co-pending U.S. Appl. No. 12/338,440 dated Aug. 1, 2011.
Financial Advice Investment Money Oct. 1, 2009 at 5:50pm, HSBC Offshore Internet Banking (as cited on Notice of Allowance in co-pending U.S. Appl. No. 12/554,659).
Financial Advice Investment Money Oct. 1, 2009 at 7:25am, HSBC Offshore Internet Banking (as cited on Notice of Allowance in co-pending U.S. Appl. No. 12/554,659).
Jane Boon Pearlstine, Lenders, Borrowers Hook Up Over The Web: Prosper.com and Other Sites Provide Forum for Individual Bidders Willing to Offer Small Loans, Wall Street Journal, May 20, 2006.
United Nations Conference on Trade and Development, E-finance and Small and Medium-Size Enterprises (SMEs) in Developing and Transition Economies, UNCTAD Expert Meeting, Oct. 17, 2001.
Tim Jones, Paradigms loast, RSA Journal, Oct. 2006, pp. 28-31.
Diego Rumiany, Internet Bidding for Microcredit: making it work in the developed world, conceiving it for the developing world, Mar. 2007.
Stefan Heng, Thomas Meyer, and Antje Stobbe, Implications of Web 2.0 for financial institutions: Be a driver, not a passenger, Munich Personal RePEc Archive, Jul. 31, 2007.
Matt Flannery, Kiva and the Birth of Person to Person Microfinance, Innovations, pp. 31-56, Winter & Spring 2007.
Michael K, Hulme and Colette Wright, Internet Based Social Lending: Past, Present and Future, Social Futures Observatory, Oct. 2006.
Richard W. Coleman, Is the Future of the Microfinance Movement to be Found on the Internet?, International Trade and Finance Association Working Papers 2007.
Amanda Scott and Patrick Towell, The web we weave, Financial World, pp. 12-15, Nov. 2006.
Prosper, Access and Transparency through Person-to-Person Lending, FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,640, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/338,365, filed Dec. 18, 2008, titled "Transfer Account Systems, Computer Program Products, and Associated Computer-Implemented Methods".
Co-pending U.S. Appl. No. 12/397,113, filed Mar. 3, 2009, titled "Person-to-Person Lending Program Product, System, and Associated Computer-Implemented Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".

Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,306, filed May 13, 2009, titled "System, Program Product, and Computer-Implemented Method for Loading a Loan on a Pre-Paid Card".
Co-pending U.S. Appl. No. 12/465,803, filed May 14, 2009, titled "System, Program Product, and Method for Loading a Loan on a Pre-Paid Card".
Co-pending U.S. Appl. No. 12/465,277, filed May 13, 2009, titled "System, Program Product, and Computer-Implemented Method for Loading a Loan on a Pre-Paid Card".
Cross, Sam Y., All About . . . the Foreign Exchange Market in the United States, 1998, Federal Reserve Bank of New York.
International Search Report from co-pending PCT Application No. PCT/US2009/034692 dated Apr. 14, 2009.
International Search Report from co-pending PCT Application No. PCT/US2009/039495 dated May 18, 2009.
International Search Report from co-pending PCT Application No. PCT/US2008/087689 dated Jun. 17, 2009.
International Search Report from co-pending PCT Application No. PCT/US2009/039492 dated May 14, 2009.
International Search Report from co-pending PCT Application No. PCT/US2009/043988 dated Jul. 14, 2009.
International Search Report from co-pending PCT Application No. PCT/US2009/039512 dated Jun. 8, 2009.
International Search Report from co-pending PCT Application No. PCT/US2009/039504 dated May 27, 2009.
International Search Report from co-pending PCT Application No. PCT/US2009/043978 dated Jun. 30, 2009.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Method, and Program Product for Retail Activation and Reload Associated with Partial Authorization Transaction".
Co-pending U.S. Appl. No. 12/609,896, filed Oct. 30, 2009, titled Machine Methods, and Program Product for Electronic Order Entry.
Co-pending U.S. Appl. No. 12/607,780, filed Oct. 28, 2009, titled Shopping Center Gift Card Offer Fulfillment Machine, Program Product, and Associated Methods.
International Search Report for PCT/US09/56072 dated Oct. 20, 2009.
Bank Deals-Best Rates and Deals: EverBank's World Currency CDs—My interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
VIPGift Receives Investment From Summit Partners and Bridgescale Partners, Nov. 11, 2008, Chattanooga, TN and Palo Alto, CA.
Office Action dated Jul. 9, 2010 for U.S. Appl. No. 12/338,365.
Office Action dated Jul. 9, 2010 for U.S. Appl. No. 12/338,645.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Co-pending U.S. Appl. No. 13/036,076, filed Feb. 28, 2011, titled Machine, Program Product, and Computer Implemented Method to Construct a Person-To-Person Loan.

(56) References Cited

OTHER PUBLICATIONS

Office Action dated Feb. 18, 2011, in co-pending U.S. Appl. No. 12/338,402.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Action dated Feb. 1, 2011, in co-pending U.S. Appl. No. 12/389,749.
Co-pending U.S. Appl. No. 12/814,405, filed Jun. 11, 2010 titled Environmental-Friendly Fuel Credit Card System, Program Product, and Computer-Implemented Methods.
Co-pending U.S. Appl. No. 12/877,490, filed Sep. 8, 2010 titled System, Program Product, and Method for Debit Card and Checking Account Autodraw.
Co-pending U.S. Appl. No. 12/877,524, filed Sep. 8, 2010 titled System, Program Product, and Method for Debit Card and Checking Account Autodraw.
Co-pending U.S. Appl. No. 12/562,331, filed Sep. 18, 2009 titled Computerized Extension of Credit to Existing Demand Deposit Accounts, Prepaid Cards and Lines of Credit Based on Expected Tax Refund Proceeds, Associated Systems and Computer Program Products.
Krino, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.
Bank of Boulder POS Debit Solution at the Table Now in Beta: First Bank to Certify IVI Spirit C2000 on MAPP(R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-pending U.S. Appl. No. 12/731,852, filed Mar. 25, 2010.
Microtrax Ltd., PC Electronic Payment Systems Reference Manuel, 1995 (381 pages).
John P. Caskey and Gordon H. Selton, Jr. Is the Debit Card Revolution Finally Here?, Federal Reserve Bank of Kansas City, Economic Review, Fourth Quarter 1994, pp. 70-95, vol. 79 #4 (17 pages).
Laura Castaneda, Business Promote Services to Customers Day In and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Súzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.
IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post.
NCR 4430-5000 MSR/PIN User's Guide, 1994, 265 pages.
Nieman Marcus: High-Tech for the Holidays, Adweek, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.
Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes up Peripherals Market, Chain Store Age, Jun. 1996, 3 pages.
O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.
David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
VeriFone TCL Terminal Control Language Programmer's Manual, VeriFone Part No. 00368-01, Revision G, Manual Revision 8.0, Aug. 1992, 362 pages.
VeriFone Tranz 330 Reference Manual, Verifone Part No. 00483—Revision D, Manual Revision 3.01, Apr. 1990, 144 pages.
MicroTrax Ltd. Omni 490M (and 490ML) Operation Manual for Integrated and Non-Integrated Configurations, 1994, 60 pages.
MicroTrax Electronic Payment Systems: The MicroTrax Pinstripe Lane Equipment Users Guide, MicroTrax Ltd., Newport Beach, CA 1991, 54 pages.
IBM 4680-4690 Supermarket Application—Electronic Funds Transfer Feature Enhancement: User's Guide, IBM Corp., Research Triangle Park, NC, Sep. 1995, 318 pages.
IBM 4680 General Sales Application Electronic Funds Transfer User's Guide, IBM Corp., Research Triangle Park, NC, Dec. 1990, 260 pages.
IBM 4680 General Sales Application Electronic Funds Transfer User's Guide, IBM Corp., Research Triangle Park, NC, Mar. 1991, 263 pages.
IBM 4680 General Sales Application: Guide to Operations, Research Triangle Park, NC, Jun. 1991, 429 pages.
Office Action dated Mar. 4, 2011, in co-pending U.S. Appl. No. 12/338,684.
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.

(56) References Cited

OTHER PUBLICATIONS

Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecom Point-of-Sale Activated Cards: All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).
Office Action for co-pending U.S. Appl. No. 12/607,780 dated Mar. 19, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
Ex-parte Quayle Action for co-pending U.S. Appl. No. 12/700,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Final Office Action for co-pending U.S. Appl. No. 12/338,540 dated Mar. 15, 2012.
Office Action from co-pending U.S. Appl. No. 12/626,349, dated Nov. 22, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Downes, How to avoid exchange charges Wasting Money A foreign currency bank account could be the answer, The Daily Telegraph, London (UK), Mar. 10, 2007.
Office Action for co-pending U.S. Appl. No. 13/232,405 dated Feb. 2, 2012.
Final Office Action for co-pending U.S. Appl. No. 12/465,277 dated Feb. 28, 2012.
Notice of Allowance for co-pending U.S. Appl. No. 12/417,182 dated Feb. 14, 2012.
Final Office Action for co-pending U.S. Appl. No. 12/338,497 dated Mar. 1, 2012.
Office Action for co-pending U.S. Appl. No. 12/877,524 dated Feb. 14, 2012.
Wolf, File History of US 2005/0278347.
Check Cashers Move Into Cards, Accounts (Cover Story), ATM & Debit News [serial online], Apr. 20, 2006, 6(24), pp. 1-3, available from Business Source Complete, Ipswich, MA.
Mango-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.
Final Office Action for co-pending U.S. Appl. No. 13/232,405 dated May 22, 2012.
Office Action for co-pending U.S. Appl. No. 13/405,051 dated Jun. 6, 2012.
Final Office Action for co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Office Action for co-pending U.S. Appl. No. 13/282,186 dated Jul. 13, 2012.
Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Notice of Allowance for co-pending U.S. Appl. No. 12/877,490 dated Sep. 20, 2012.
Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Office Action for co-pending U.S. Appl. No. 13/214,126 dated Oct. 4, 2012.
Notice of Allowance for co-pending U.S. Appl. No. 13/607,780 dated Oct. 9, 2012.
Final Office Action for co-pending U.S. Appl. No. 13/232,700 dated Oct. 12, 2012.
Office Action for co-pending U.S. Appl. No. 13/284,524 dated Oct. 15, 2012.
Notice of Allowance for co-pending U.S. Appl. No. 13/601,724 dated Oct. 18, 2012.
Notice of Allowance for co-pending U.S. Appl. No. 12/417,162 dated Oct. 1, 2012.
Notice of Allowance for co-pending U.S. Appl. No. 12/607,780 dated Oct. 9, 2012.
Office Action for co-pending U.S. Appl. No. 13/536,765 dated Nov. 30, 2012.
Notice of Allowance for co-pending U.S. Appl. No. 13/282,186 dated Dec. 17, 2012.

(56) References Cited

OTHER PUBLICATIONS

Final Office Action for co-pending U.S. Appl. No. 12/892,847 dated Aug. 12, 2014.
Hori et al. "Did the Shopping Coupon Program Stimulate Consumption? Evidence from Japanese Micro Data" ESRI Discussion Paper Series No. 12, Apr. 2002, 45 pages.
Office Action for co-pending U.S. Appl. No. 12/367,187 dated Sep. 24, 2014.
Office Action for co-pending U.S. Appl. No. 12/389,749 dated Oct. 3, 2014.
Office Action for co-pending U.S. Appl. No. 13/287,725 dated Aug. 25, 2014.
Office Action for co-pending U.S. Appl. No. 13/349,290 dated Oct. 22, 2014.
Office Action for co-pending U.S. Appl. No. 13/782,550 dated Sep. 12, 2014.
Office Action for co-pending U.S. Appl. No. 13/863,578 dated Sep. 30, 2014.
Final Office Action for co-pending U.S. Appl. No. 12/367,187 dated Feb. 12, 2014.
Final Office Action for co-pending U.S. Appl. No. 12/889,281 dated Apr. 8, 2013.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/349,290 dated Mar. 14, 2013.
Garriss, J., (2004), Forging an ideal HSA, Workspan, 47(5), 18-25, Retrieved Sep. 3, 2013.
Office Action for co-pending U.S. Appl. No. 12/367,187 dated Aug. 1, 2013.
Office Action for co-pending U.S. Appl. No. 12/397,113 dated Oct. 15, 2013.
Office Action for co-pending U.S. Appl. No. 13/287,725 dated Jan. 17, 2014.
Office Action for co-pending U.S. Appl. No. 13/450,617 dated May 12, 2014.
Final Office Action for co-pending U.S. Appl. No. 12/389,749 dated Dec. 11, 2014.
Health Savings Account (HSA): Horizon Blue Cross Blue Shield of New Jersey, Small Employer Guide, Jan. 2006, 18 pages.
Kent FOC Newsletter, retrieved at www.accesskent.com/Courts/FOC/pdfs/newsletter/022006.pdf, Feb. 2006, 1 page.
Office Action for co-pending U.S. Appl. No. 12/397,113 dated Nov. 3, 2014.
Office Action for co-pending U.S. Appl. No. 12/731,852 dated Nov. 10, 2014.
Office Action for co-pending U.S. Appl. No. 12/892,847 dated Nov. 5, 2014.
Office Action for co-pending U.S. Appl. No. 13/287,725 dated Sep. 26, 2013.
Office Action for co-pending U.S. Appl. No. 13/450,617 dated Oct. 28, 2014.
Office Action for co-pending U.S. Appl. No. 13/036,076 dated Jan. 29, 2015.
Office Action for co-pending U.S. Appl. No. No. 13/232,700 dated Jan. 29, 2015.
Office Action for co-pending U.S. Appl. No. 13/782,550 dated Dec. 17, 2014.
Office Action for co-pending U.S. Appl. No. 14/071,386 dated Dec. 16, 2014.

* cited by examiner

| Product Provider (IIN, Trade Name) | Product Transaction Identifier (or Product Identifier Number) | Product Identification (UPC, SKU, Name) |
|---|---|---|
| 400001 | 4000...01 | 101LLLLLL01010RRRR01101 |
| 400001 | 4000...02 | 101LLLLLL01010RRRR02101 |
| 400001 | 4000...03 | 101LLLLLL01010RRRR03101 |
|  | *** |  |
| 400001 | 4000...XX | 101XXXXXX01010XXXXXX101 |
| 400002 | 4000...01 | 101LLLLLL01010RRRR01101 |
| 400002 | 4000...02 | 101LLLLLL01010RRRR02101 |
| 400002 | 4000...03 | 101LLLLLL01010RRRR03101 |
|  | *** |  |
| 400002 | 4000...XX | 101XXXXXX01010XXXXXX101 |
| 4000XX | 4000...01 | 101LLLLLL01010RRRR01101 |
| 4000XX | 4000...02 | 101LLLLLL01010RRRR02101 |
|  | *** |  |
| 4000XX | 4000...XX | 101XXXXXX01010XXXXXX101 |

MACHINE, METHODS, AND PROGRAM PRODUCT FOR ELECTRONIC INVENTORY TRACKING

This application claims priority to and the benefit of U.S. Provisional Patent Application No. 61/118,127, filed Nov. 26, 2008, titled "System, Apparatus, Methods, And Program Product For Electronic Inventory Tracking," and is related to U.S. Non-Provisional patent application Ser. No. 12/554,432, filed Sep. 4, 2009, titled "System, Method, and Program Product for Retail Activation and Reload Associated with Partial Authorization Transactions," and U.S. patent application Ser. No. 12/609,896, filed Oct. 30, 2009, titled "Machine Methods, And Program Product For Electronic Order Entry," each incorporated by reference in its entirety.

BACKGROUND OF THE INVENTION

1. Field of the Invention

The present invention relates generally to electronic inventory management. More specifically, the present invention relates to machines, methods, and program products for facilitating electronic inventory management of products through messaging over existing financial services electronic payment networks.

2. Description of the Related Art

As computers continue to become faster and faster and as database access and database management continues to improve, the prospects of, and the desire for, instituting viable and cost-effective electronic inventory tracking systems by managing entities, e.g., manufacturers, product suppliers, shippers, etc., has evolved. A conventional application of an electronic inventory tracking system includes barcodes or radiofrequency identification tags placed on products, which can be readily scanned as products are shipped between various brick and mortar facilities. Such electronic inventory tracking systems perform superbly when the product stays within the control of the specific entity, i.e., manufacturer, product supplier, or shipper.

Such systems, however, have an inherent lag and often fail when the products are being placed outside the control of the managing entity. That is, once the products are delivered to retail merchants, for example, the managing entity must rely on the retail merchants to provide the desired data or incur significant expense to send in manual teams to collect this data. Various large retail merchants having robust information technology departments have tried to help reduce such inherent lag by allowing manufacturers and suppliers direct access to their sales activity data. Individual local franchises and other smaller retailers, however, although collectively accounting for substantial portions of the products being sold in certain select categories, generally do not have the resources to provide the manufacturers and suppliers such data in such manner—instead, periodically providing sales data in compiled reports, if at all.

As such, in order for the managing entity to determine what and how much of its product or products have been sold by the merchant, the managing entity must either wait for reports sent from the merchant, or in many cases, send a person on-site to visually inspect current inventory. Such personal visits, although having some benefits, still do not necessarily provide accurate inventory or sales reporting data. On countless occasions, the person sent to perform the on-site inspection, being only marginally familiar with the storage facilities owned by the retail merchant, may overlook a storage location that the busy retail merchants forgot to identify. Other errors occur when, for example, various inventory is misidentified or shelved improperly; an error that may only be discovered after the on-site visitor pre-orders additional product, only to have it refused by the merchant.

Although not necessarily employing or even familiar with the latest computer technology being used for inventory or sales tracking, these same retail merchants have been found to be quite familiar and extremely comfortable with employing the latest in point-of-sale ("POS") technology. Accordingly, a machine, program product, and methods for facilitating electronic inventory management of products through messaging over existing financial services electronic payment networks which utilizes existing POS technology, and which does not require use of a conventional online computer system to retrieve sales tracking or other inventory management data is described herein.

SUMMARY OF THE INVENTION

In view of the foregoing, various embodiments of the present invention advantageously provide a machine, program product, and method for facilitating electronic inventory management of products through messaging over existing financial services electronic payment networks, which utilize existing point-of-sale ("POS") technology, and which does not require use of a conventional online computer system to retrieve sales tracking or other inventory management data. Various embodiments of the present invention advantageously provide a service that enables a product provider (e.g., manufacturer, supplier, etc.) to obtain real-time inventory data by assigning individual product sets traditional credit card identification numbers compatible with a traditional financial services electronic payment network, e.g., MasterCard®, Visa®, American Express®, or Discover® network, and that enables a consumer or retail merchant to scan or otherwise enter such data into a POS terminal which can correspondingly relay real-time purchase transaction data over the payment network for use by the product provider or other managing entity. Advantageously, such service can be offered to any business and can be made available anywhere that the associated financial services electronic payment network is available.

More specifically, an example of an embodiment of a machine for facilitating electronic inventory management of serialized products through messaging over an existing financial services electronic payment network can include a database containing lookup tables positioned to relate each of a plurality of universal product-transaction identifiers to a corresponding product set of a plurality of product sets and a corresponding associated product set code, such as a universal product code, and a processor configured to operate on the computer, the processor executing a program product stored in a memory accessible by the processor and executable on the processor and positioned to perform a process of messaging over an existing financial services electronic payment network and the process of updating inventory data for each of a plurality of product sets, the computer program product performing the steps of generating a plurality of unique financial services electronic payment network compatible universal product-transaction identifiers (often referred to as a Primary Account Number or PAN when applied to a payment card), and assigning or otherwise associating each separate one of the plurality of universal product-transaction identifiers with a different set of a plurality of product sets. Each of the plurality of universal product-transaction identifiers includes a common, e.g., financial transaction bank identification number ("BIN") also interchangeably referred to as an issuer identifier number ("IIN") and a product identification number. According to this example, each product within each single product set of the plurality of product sets is characterized by being a same type, size, and quantity as each other product in the respective same product set. Each product within each single product set of the plurality of product sets also has a same universal product code associated therewith that is different from the universal product code associated with each product in any of the other product sets of the plurality of product sets. Further, each product within each one of the plurality of product sets is different or otherwise differentiated from each product in any of the other product sets of the plurality of product sets by at least one of the following: type, size, quantity, and delivery mode. The products, either through enhanced product packaging or through use of an enhanced product identification purchase ticket or slip, are configured to interface with the merchant's POS terminal (e.g., through use of a magnetic stripe) to enable electronic inventory tracking over the existing financial services electronic payment network, e.g., MasterCard®, Visa®, American Express®, and/or Discover® networks.

The machine can also include providing the plurality of universal product-transaction identifiers to a product provider for placement on respective associated products, with each associated product coupled with a transaction identifier storage medium for storing the respective associated universal product-transaction identifier, and with each transaction identifier storage medium configured to interface with a POS terminal positioned to receive the respective universal product-transaction identifier to thereby facilitate electronic inventory management over the existing financial services electronic payment network using the universal product-transaction identifier. The machine can also of receive a purchase transaction message sent through the financial services electronic payment network from each of a plurality of retail merchants each having a POS apparatus including a POS terminal. The purchase transaction message can include the universal product-transaction identifier that is associated with the respective product being purchased. According to this example, the universal product-transaction identifier is received through a respective POS terminal responsive to the POS terminal receiving the respective universal product-transaction identifier as a result of the customer or merchant, for example, swiping the product container or product identification ticket or slip through the magnetic stripe slot of the POS terminal. The method can also include storing purchase transaction data associated with the plurality of product sets purchased across the plurality of retail merchants, for access by the product provider—with the purchase transaction data being related by universal product code to the received universal product-transaction identifiers (for storage).

An example of an embodiment of a machine for facilitating electronic inventory management of a serialized product through messaging over an existing financial services electronic payment network, can also include an externally accessible storage medium for storing a universal product-transaction identifier associated with each same product within one single set of a plurality of sets of, e.g., non-transaction card, products, and a retail container carrying the storage medium. The retail container can be in the form of a packaging container containing a non-transaction card, a product associated with the universal product-transaction identifier stored in the storage medium, or a product identification ticket or slip. According to this example, each product within each single product set of the plurality of product sets is characterized by being a same type, size, and quantity as each other product in the respective same product set. Each product within each of one the plurality of product sets is different from each product in any of the other product sets of the plurality of product sets by at least one of the following: type, size, quantity, and delivery mode. Additionally, each product within each single product set of the plurality of product sets also has a same universal product code associated therewith that is different from the universal product code associated with each product in any of the other product sets of the plurality of product sets. Further, according to this example, the transaction identifier storage medium is configured to interface with a point-of-sale terminal positioned to receive the respective universal product-transaction identifier. Advantageously, as described above, such universal product-transaction identifier assigned or otherwise associated with the product can be used to access the existing financial services electronic payment network to enable the provision, receipt, and storage of purchase transaction data over the payment network, as part of the purchase process.

An example of an embodiment of a machine for facilitating electronic inventory management of serialized products through messaging over an existing financial services electronic payment network, can receive data from a product apparatus, i.e., either a product with enhanced product packaging or an enhanced product identification purchase ticket/slip, such as, for example, that described above; an inventory management computer positioned remote from and in communication with a merchant POS apparatus/terminal over the existing financial services electronic payment network to receive and process purchase transaction data; and electronic inventory management program product stored in the memory of the inventory management computer, for example, as described below.

An example of an embodiment of an electronic inventory management program product for facilitating electronic inventory management of serialized products through messaging over an existing financial services electronic payment network, can include a set of instructions that, when executed by one or more computers or processors, cause the one or more computers or processors to perform various operations including, for example, receiving a first purchase transaction message from a merchant POS apparatus responsive to a user interfacing the storage medium storing a universal product-transaction identifier of a selected one of the products of the plurality of product sets with the merchant POS apparatus. If the merchant POS apparatus supports partial authorization messaging, the message can include a flag indicating a capability of the merchant POS apparatus to, support partial-authorization messaging, along with at least a portion of the universal product-transaction identifier assigned to the selected product. The operations can also include storing purchase transaction data associated with the product being purchased for use by the respective product provider, sending partial-authorization approval data to the respective merchant POS apparatus responsive to receiving the first purchase transaction message, and receiving a second payment message defining a purchase acknowledgment from the respective merchant POS apparatus acknowledging that the merchant POS apparatus or a merchant associated therewith received from a purchasing customer sufficient monetary funds to purchase the respective product. The operations can also include making available through an external communications network not associated with the financial services electronic payment network, at least portions of the purchase transaction data to the product provider.

The operations can also include either the same computer/processor or a different computer/processor, generating the plurality of unique financial services electronic payment network compatible universal product-transaction identifiers on a common, e.g., financial transaction IIN, and associating each separate one of the plurality of universal product-transaction identifiers with a different product set of the plurality of product sets. The operations can further include providing the plurality of universal product-transaction identifiers to the product provider for universal product-transaction identifier placement on respective associated products.

Embodiments of the present invention provide at least two primary benefits: (1) efficiency for product distribution; and (2) the provision of real-time sales data to identify customer trends and behavior. Regarding efficiency, if a distributor, for example, can eliminate the step where the driver performs a manual inventory at the merchant site, and instead pre-stocks the delivery truck with only what is needed in the order of the route, the distributor can substantiality increase delivery throughput. Regarding the provision of real-time sales data, if there is a spike in demand for 32 oz. orange soda on a Tuesday, the bottler can start producing more on Tuesday or Wednesday, if needed.

To accomplish these benefits, according to various embodiments of the present invention, the unique universal product-transaction identifier assigned to a specific group of same products is in the form of an electronic payment network compatible transaction card number, which includes an, e.g., financial transaction IIN and a product identification number associated with a specific type of product. Also, a product itself can be configured to interface with a POS terminal to enable electronic product purchase tracking over the existing financial services electronic payment network using the universal product-transaction identifier, for example, which can be assigned according to a product identifier such as a universal product code or stock keeping unit.

BRIEF DESCRIPTION OF THE DRAWINGS

So that the manner in which the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 6 is a diagram of a table identifying a product being purchased according to an embodiment of the present invention;

DETAILED DESCRIPTION

Figure 1:
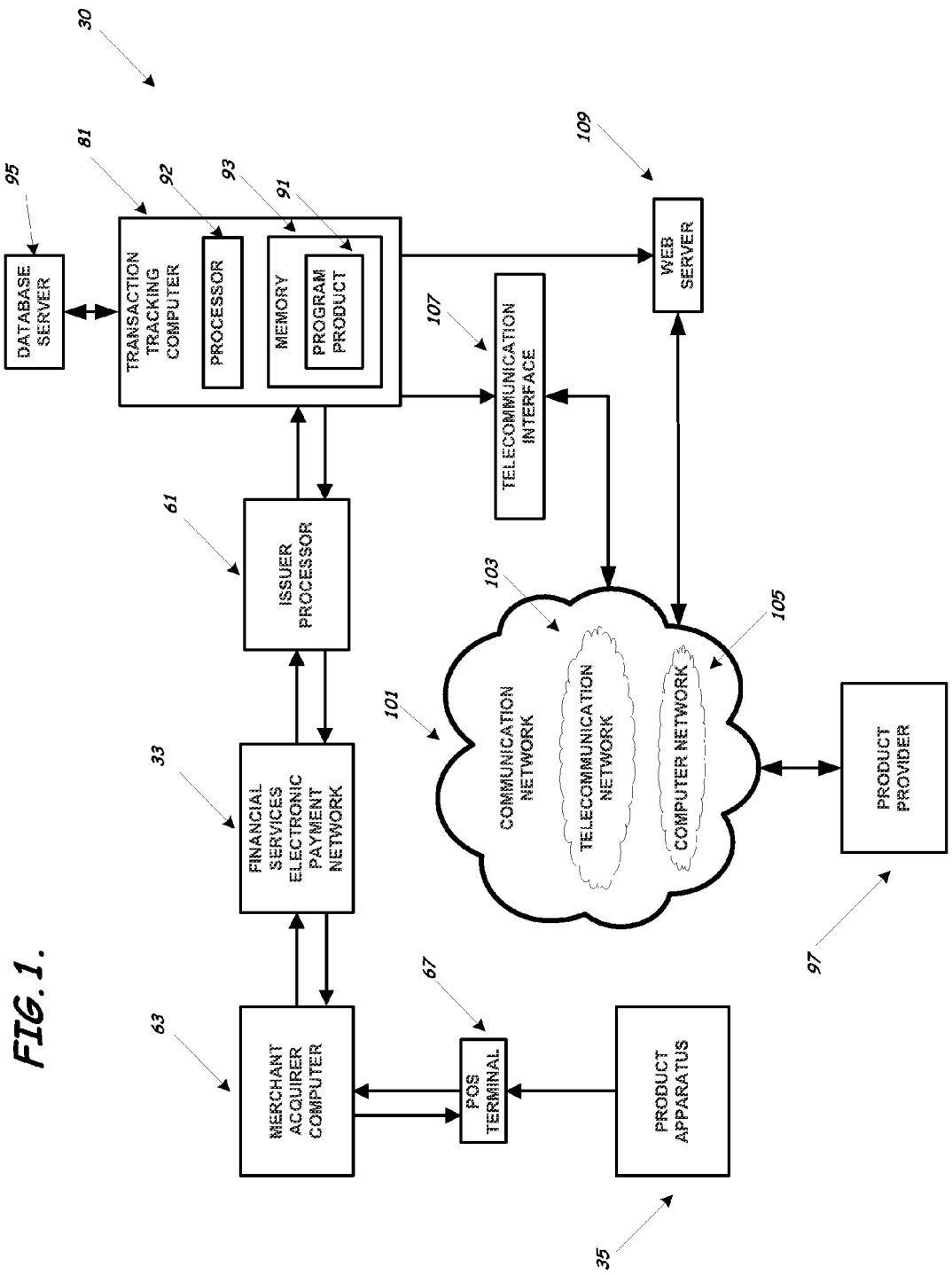
FIG. 1 is a schematic diagram of a general machine architecture of a machine for facilitating electronic inventory management of serialized products through messaging over a financial services electronic payment network according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments. Note, the term product as used herein includes packaged and unpackaged goods, documentation of services, or goods and services collectively and individually defining products.

Manufacturers and other product suppliers typically know how much product from a batch has been shipped to their retail outlet. Without a physical count, however, they generally do not know, real-time, how many products of different batches have been sold to individual customers for a single retail outlet/merchant, much less across multiple retail outlets/merchants. Barcodes, RFID tags, etc., affixed to products, however, provide the downstream merchant an automated methodology of tracking product sales. In a typical scenario, the manufacturer or other product suppliers affix to the product a barcode label identifying the product. The serialized product is then typically delivered either directly, or through wholesalers, to multiple retail merchants for distribution to individual retail customers. Then, as the product is sold, the barcode is scanned to record the sale. This data can be compiled by each separate retail merchant and provided to the product supplier. Such data, however, is often stale upon arrival and is often plagued with inaccuracies.

Various embodiments of the present invention include systems, apparatus, program product, and methods which use a magnetic label, RFID tag, or other storage media containing a "universal product-transaction identifier" often referred to as a "Primary Account Number" or "PAN," which includes an, e.g., financial transaction issuer identifier number ("IIN") to track sales of each individual product. According to various embodiments of the present invention, at checkout, the IIN/PAN is swiped or read using, e.g., RF-PayPass®, PayWave®, etc., at a point-of-sale ("POS") terminal having access to a conventional financial services electronic payment network. Partial authentication logic, for example, can then be used to capture its sale and keep the transaction moving. Such data can beneficially provide a real time record of specific product items being sold, allowing the manufacturer or product supplier to perform real-time inventory management based on real-time product sales data.

For example, at the end of the transaction, the manufacturer or product supplier can know with certainty that 32 oz Product X was sold at the Merchant Gas Station Y located on 100 Main St on October 1 at 10:02 PM. The product manufacturer or supplier can beneficially not only access this near real-time sales data to find out not only how much overall product has been sold, but can do so at the universal product code ("UPC") or stock keeping unit ("SKU") level, as well as receive the date and time of the purchase behavior. This data, across multiple merchants, especially the smaller merchants, can be extremely valuable to the manufacturer or supplier of Product X for product manufacturing or inventory planning. In addition, since the manufacturer of Product X, or the distributor, generally delivers Products X, Y, Z, on a regular basis, according to embodiments of the present invention, the delivery truck driver can arrive and know in advance which of Products X, Y, Z, is needed, and in what quantity.

A substantial improvement in delivery and efficiency can be realized, compared with that of the conventional process where the distributor loads the truck with all SKU's and the delivery driver enters the merchant store, performs a manual inventory, and then returns to the truck to replenish the inventory levels. As a result of implementation of various embodiments of the present invention, the distributor can eliminate the step where the driver performs a manual inventory check and can instead pre-stock the delivery truck with only what is needed and in the order of the route, thereby increasing delivery throughput. Additionally, such real-time sales data can be used to identify customer trends and behavior. If there is a spike in demand for Product X is identified on a Tuesday, the manufacturer they can start producing more Product X as early as that day.

A machine 30 for facilitating electronic inventory management of products 31 through either traditional or partial authentication messaging over an existing (traditional) financial services electronic payment network 33 is shown in FIG. 1. The machine includes a POS terminal 67 for receiving the payment using the product apparatus 65; a merchant acquirer computer 63 for accepting the transaction and facilitating communication of the transaction; a payment network 33 provided to identify an issuer associated with the product provider, an issuer processor computer 61 for processing the transaction; and a member transaction processing computer 81 for executing the instructions for facilitating the inventory management of products from the product provider 97 through communications network 101. As one skilled in the art will appreciate, the merchant acquirer, payment network, and issuer processor computer are component of a traditional payment transaction system that enables credit transactions with a merchant, e.g., consumer credit card and debit card systems, and as such, machine 30 can process payment information in addition to and in conjunction with the inventory management functions of the instant invention.

Communication network 101 connects the product apparatus 35 to the merchant acquirer computer 63, financial services electronic payment network 33, issuer processor computer 61, the transaction tracking computer 81 and the product provider 97 (though the communications network 101 is depicted connecting only the customer 65, product provider 97 and transaction tracking computer 81) and can include, for example, a telecommunication network 103, which can include a wire-based telephone network, pager network, cellular network, or a combination thereof, and a computer network 105. As one skilled in the art will appreciate, the computer network 105 can connect all of the system components using a local area network ("LAN") or wide area network ("WAN"), or a combination thereof. For example, financial services electronic payment network 33, issuer processor computer 61, and transaction-tracking computer 81 may be associated with the same entity and are thereby configured as a plurality of servers operating together in a LAN. Alternatively, the merchant acquirer computer 63 and payment network may be the same entity and operate together using a LAN, but use a WAN to connect to the issuer processor computer 61. Accordingly, though not all such configurations are depicted, all are within the scope of the disclosure.

Figure 5:
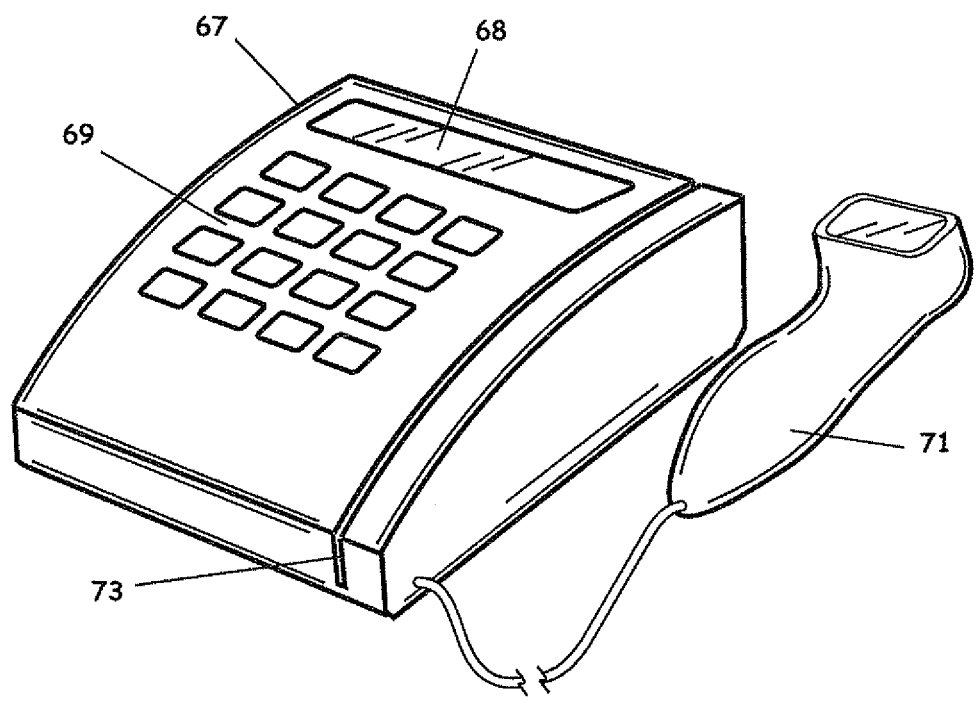
FIG. 5 is a perspective view of a merchant point-of-sale terminal adapted to interface with both product apparatus shown in FIGS. 2 and 3 according to an embodiment of the present invention.

Product apparatus 35 connects to the POS terminal 67, which can be, e.g., a terminal at a merchant or, alternatively, a device interface such as a telephone or computer connected to an internet, connection, and initiates the product order by accessing the machine 30 using same. As shown in FIG. 5, the POS terminal 67 can include a keypad 69 so that a customer can enter an electronic order card number; a barcode scanner 71 (so the merchant can scan a barcode associated with the order, a product, or a portion of an electronic order card); and a magnetic stripe reader/slot 73 (so the merchant or customer can scan a magnetic stripe on the electronic order card. Alternative embodiments of the POS terminal 67 can include an RFID interface (not shown) and/or a contact memory button reader (not shown). The POS terminal 67, further includes various software and hardware for interfacing with the merchant acquirer computer 63, financial services electronic payment network 33, and issuer processor computer 61, as known and understood by those skilled in the art. For example, the POS terminal 67 may include a computer display screen (not shown) for displaying transaction data, a computer memory such RAM, ROM and related hard disk storage for storing transaction data or computer instructions, a computer processor for executing computer instruction, and associated buses for data input and output, including those to connect the POS terminal 67 to the LAN or WAN for interaction with the machine 30.

Figure 2:
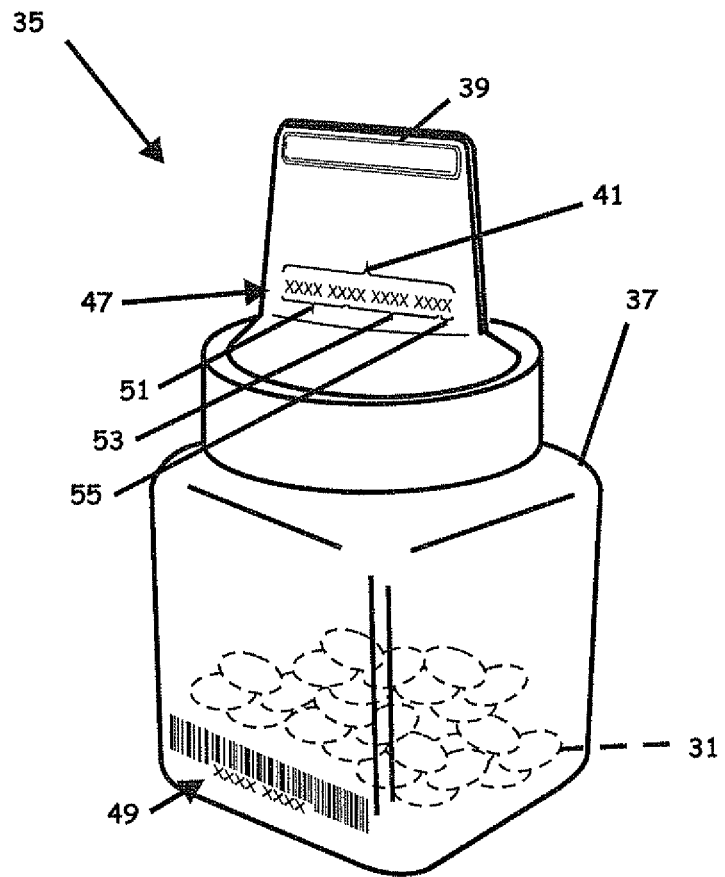
FIG. 2 is a perspective view of a product apparatus in the form of a medication container carrying a storage medium having stored thereon an universal product-transaction identifier according to an embodiment of the present invention.
Figure 3:
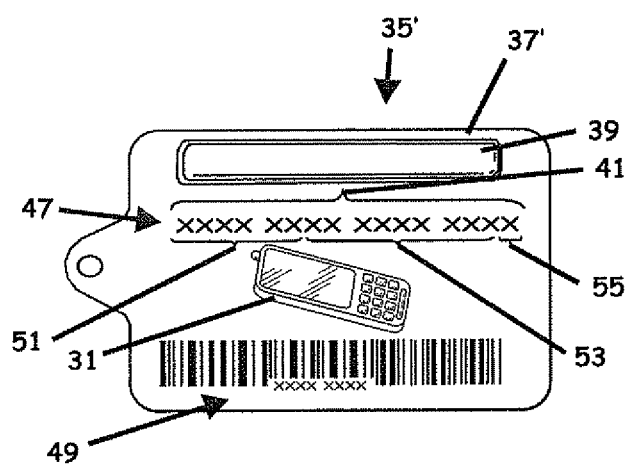
FIG. 3 is a perspective view of an alternate embodiment of a product apparatus in the form of a product identification purchase ticket according to an embodiment of the present invention.
Figure 4:
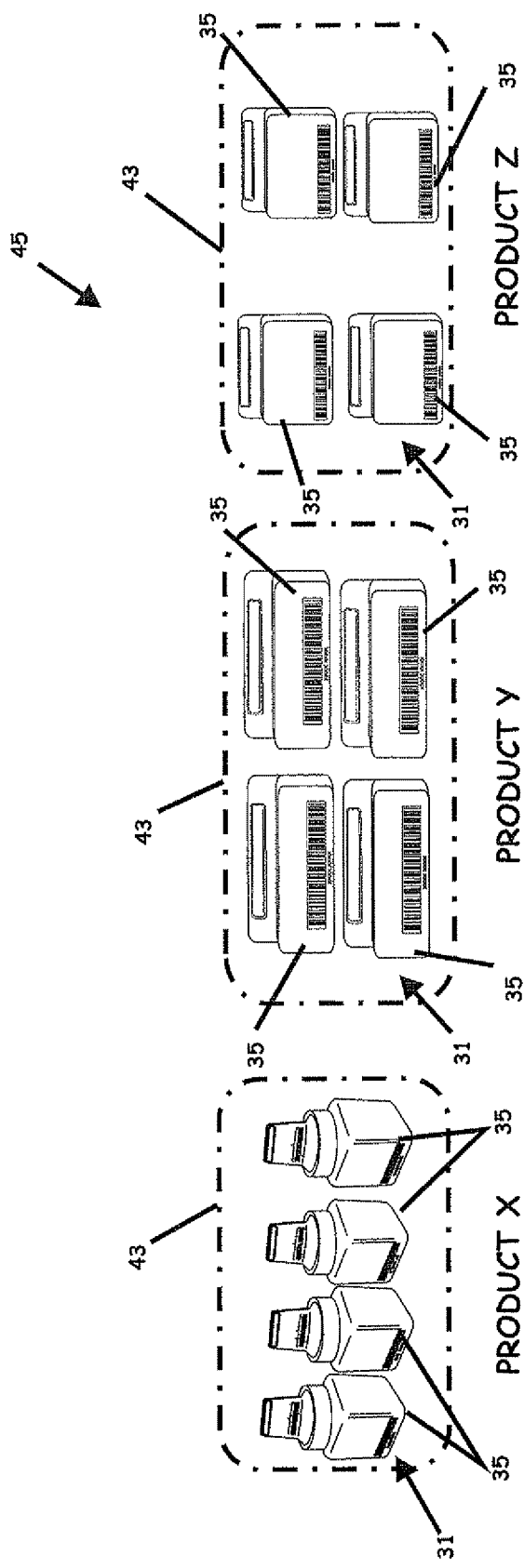
FIG. 4 is a schematic diagram of various product groupings illustrating universal product-transaction identifier assignment according to an embodiment of the present invention.

To use the POS terminal 67, and thereby access the machine 30, a user swipes or otherwise enters order information carried on a product apparatus 35 for a consumer product or the like. An exemplary product apparatus 35, 35' is shown in FIGS. 2, 3 AND 4. In a preferred methodology, the universal product-transaction identifier 41 is extracted from the product apparatus 35, 35', and passed to the merchant acquirer computer 63 in response to a customer or merchant swiping or otherwise interfacing a product apparatus 35, 35' with a POS terminal 67, or by entering the purchase transaction identifier number 41 directly into the POS terminal 67 via keypad 69 (FIG. 5). As one skilled in the art will appreciate, product apparatus 35, 35' can comprise different container media 37, 37' representing the product 31 in the form of, for example, a product identification purchase ticket or slip, cards, hang tags, product containers, etc., that carry or otherwise contains a universal product-transaction identifier 41 assigned to or otherwise associated with each same product 31 of a set 43 of same products which are part of a plurality of sets 45 of different products 31. Accordingly, one POS terminal 67 can be used with one or more container media 37 according to the embodiments of the invention, and the container media 37 may be non-transaction card products 31, e.g., product containers, service tickets, hang tags, labels, etc., but can also be financial card products, e.g., credit and debit cards.

In one configuration, the product apparatus 35 can include the container medium 37 containing a product 31, e.g., medication or the like, and having a universal purchase transaction identifier number 41 carried thereon. The container medium 37 may be, e.g., a pill bottle or other packaging, that may be manufactured so that at least one of a storage medium 39, a purchase transaction identifier number 41, or a bar code 49, is printed or otherwise affixed on the product apparatus 35. For example, the container medium 37 may be a pill bottle with a cap portion and a bottle portion, with the cap portion having a distal end for engaging a magnetic stripe reader in, e.g., POS 67. To engage the POS 67, the cap portion may have a substantially card shaped, flat portion made from, e.g., 30 mm plastic and a magnetic stripe formed thereon. As one skilled in the art will appreciate in these exemplary configurations, the purchase transaction identifier number 41 may be manually entered into the POS terminal 67 using the keypad 69 e.g., a product apparatus using the bar code 49 or the transaction identifier number image 47; the purchase transaction identifier number 41 can be read by swiping the product apparatus 35 through the a magnetic stripe reader/slot 73, e.g., a product apparatus using the storage medium 39 disposed on the card-shaped, flat potion of the product apparatus 35; or the purchase transaction identifier number 41 can be read using bar code scanned 71, e.g., a product apparatus using the bar code 49. As one skilled in the art will appreciate, the product apparatus 35, may use the storage medium 39; the purchase transaction identifier number 41, the bar code 49 printed on the product apparatus 35, or any combination thereof or any equivalent methods as known or obvious to those skilled in the art.

An alternative product apparatus 35' is illustrated in FIG. 3. Here the product apparatus 35' consists of a container medium 37', taking the form of, e.g., a card, a hang tag, a removable label or the like that may be substantially rectangular and made from plastic, or other material, and a storage medium 39', a product identification number 41', a bar code 49'. As shown the product apparatus 35' may also include, for example, an adhesive backing so that the card, hang tag or label can be removed from the product, a hole in one portion of the card, hang tag or label to attach same to a product, or a graphic 31' of the associated product so a user can match an assortment of cards, hang tags or labels to the proper products. Like the product apparatus 35, product apparatus 35' can initiate the machine 30 by entering the purchase transaction identifier number 41' into the POS terminal 67 using the keypad 69 e.g., a product apparatus using the bar code 49' or the transaction identifier number image 47'; by swiping the card, hang tag, label or the like, through the a magnetic stripe reader/slot 73, e.g., a product apparatus using the storage medium 39' disposed thereon; or by using bar code scanned 71, e.g., a product apparatus using the bar code 49'.

As shown in FIGS. 2 and 3, the storage medium 39 and 39' affixed to or otherwise carried by or contained within the product apparatus 35, 35' (illustrated in the figures in the form of a magnetic stripe), stores a copy of the universal product-transaction identifier 41. For example, the storage media 39, 39' may be a magnetic stripe that may store data on three separate tracks, tracks one and two, which are traditionally read only tracks, could store the universal product transaction identification number, merchant name, product provider, product identifier etc., and track three, traditionally a read/write track, could allow data to be written to the magnetic stripe, e.g., identification of stock data, location information, etc. However, as one skilled in the art will recognize, in alternative embodiments, the universal product-transaction identifier 41 may be the only thing stored in the various card storage media. As one skilled in the art will recognize, other configurations of the storage medium 39, 39', include, for example, a radiofrequency identification ("RFID") tag, a contact memory button, or other comparable storage medium, capable of storing the universal product-transaction identifier 41 and any of the other product data such as the product manufacturer, for transmission/retrieval by a merchant point-of-sale terminal 67 (FIG. 1).

Moreover, as one skilled in the art will appreciate, the product apparatus 35, 35', may use the storage medium 39, 39', the purchase transaction identifier number 41, 41', the bar code 49, 49' printed on the product apparatus 35, 35', individually or in any combination thereof or any equivalent methods as known or obvious to those skilled in the art. For example, the purchase transaction identifier number 41 can be printed on the product apparatus and stored in the storage medium, while the bar code 49, 49' contains the product UPC or SKU number for inventory management by the merchant. Such a system would require two data entry steps at the POS terminal, but could reduce any delay between inventory updates between the merchant and issuer. Alternatively, the bar code could contain the purchase transaction number, and no other identification means could be used. Moreover, rather than labeling or embossing the actual universal product-transaction identifier number 41 on the external surface of the container medium 37, 37', some businesses may choose to not visually divulge the universal product transaction identifier number 41, i.e., some may provide no identifier number at all on the container medium surface, or may use/assign some other identifier number that is uniquely associated with the universal product transaction identifier number 41, for example, for use during conversations with customer service, etc.

The universal product-transaction identifier 41 may be a numerical identifier that includes an IIN 51, i.e., a number, typically six (6) digits, for example, used to identify the issuing bank or other issuer so that messages can be routed through the payment network; a unique product identifier number 53 used for identifying a specific product, and a checksum digit 55. In operation, a manufacturer or product supplier working with an issuer or processor, or the issuer, itself, assigns a different payment network compatible payment card number received from the issuer to each product. In addition, an individual issuer could assign multiple IIN numbers for different product providers, and the payment network would route each of the IIN numbers to the same issuer for processing, i.e., parsing the universal product transaction identifier number 41, by manufacturer and then associating the product identifier number to the product. For example, as shown in FIG. 6, the issuer could assign Soft Drink Company X the IIN 400001 and Soft Drink Company X could associate the product identifier 4000 . . . 01 for its Orange 12 oz; 4000 . . . 02 for its Orange 32 oz; 4000 . . . 03 for its Grape 12 oz, and so on, which can then be associated with a UPC or SKU. The end result is that each different UPC or SKU 49 has assigned a corresponding card number (universal product-transaction identifier 41) that has a format that conforms to a financial services electronic payment network's specifications.

Moreover, according to various embodiments of the present invention, the IIN 51 may identify a financial issuer, such as a bank, that will settle financial transactions, or may identify a non-financial issuer, such as a manufacturer, that will not settle financial transactions, and in such embodiments, the IIN is used to route the transaction data to the issuer through the financial services network not to identify the product provider. Here, different read tracks of the storage device, i.e., that might contain data related to a product provider associated with the universal product transaction identifier, could be read into the network for transmittal to the issuer so that the issuer could match an incoming universal product transaction identifier with the product provider identified in the message. Moreover, a single issuer may assign an IIN according to transaction type, i.e., whether the IIN is associated with a financial transaction or the IIN is associated with an inventory management transaction, and manage incoming purchase transaction messages accordingly. As one skilled in the art will appreciate, several other configurations compatible with at least one traditional financial service electronic payment network 33, however, are within the scope of the present invention.

Once the POS terminal 67 receives the universal product-transaction identifier 41, and any other data that may be stored in the storage medium, from the product apparatus 35, the POS terminal 67 may append time of sale data thereto for transmission, i.e., and any additional transaction information such as the transaction date, transaction time, merchant identification, etc., and thereby assemble a purchase transaction message for transmittal. The purchase transaction message is then encrypted and transmitted through the communications network 101 to the merchant acquirer computer 63. The merchant acquirer computer is both configured and positioned in communication with the issuer processor computer 61 through the financial services electronic payment network 33, and decrypts the purchase transaction message, including the universal product-transaction identifier 41, and appends additional data, such as the merchant acquirer identification, there to for transmission of the purchase transaction message to the financial services electronic payment network 33. As one skilled in the art will recognize, in addition to transmitting the universal product-transaction identifier 41, the merchant acquirer could also transmit settlement data to the payment network so that the merchant or product provider 97 can receive payment in conjunction with the order. To perform these duties, merchant acquirer computer 63, for example, consists of at least one computer, though it can be implemented as one or more computers each having a processor and memory coupled to the processor to store operating instructions therein, which can be configured in the form of a server.

The merchant acquirer computer 63 transmits the purchase transaction message, including the universal product-transaction identifier 41, to the financial services electronic payment network 33, which operates to set transaction rules, facilitate transactions, settles funds between parties, engages in risk mitigation etc. Examples of payment networks 31 are e.g., MasterCard®, Visa®, American Express®, or Discover® network. At the financial services electronic payment network 33, the purchase transaction message is decrypted so that the issuer can be identified using the IIN portion of the universal product transaction identifier 41, and the purchase transaction message is then routed to the appropriate issuer 61. The financial services electronic payment network 33 can be configured as one or more computers each having a processor and memory coupled to the processor to store operating instructions therein, which can be configured in the form of a server.

The financial services electronic payment network 33 routes the purchase transaction message, including the universal product-transaction identifier 41, which may be encrypted before transmission, to the issuer processor computer 61. The issuer processor computer 61 traditionally funds transactions, i.e., bills the customer a charge, and can be e.g., a bank. Here, in addition to settling merchant accounts, the issuer processor computer 61 transmits inventory data, using for example, the purchase transaction message and universal product-transaction identifier 41, for inventory management by a transaction-tracking computer 81. To achieve this end, the issuer processor computer 61, can be implemented as one or more computers each having a processor and memory coupled to the processor to store operating instructions therein, which can be configured in the form of a server.

The issuer processor computer 61 sends at least a portion of the purchase transaction message, including the universal product-transaction identifier 41, to the transaction-tracking computer 81. Transaction tracking computer 81 performs many of the functions of the machine related assigning a plurality of universal product-transaction identifiers. To achieve this, transaction tracking computer could be configured as an application server or plurality of application servers connected to and as a part of the issuer processor computer 61 and accessible by a plurality of workstations associated with the issuer processor computer 61, as shown in FIG. 15.

It should also be understood that the illustrated merchant acquirer computer, payment network, issuer processor computer and transaction tracking computer configuration are given by way of example and that other types of servers or computers configured according to various other methodologies known to those skilled in the art, can be used. For example, a single computer, a plurality of computers, a server, or server cluster or server farm may be employed, and this disclosure does not limit any configuration of computers and servers for each. Moreover, each may be deployed at a server farm or server cluster managed by a server host, and the number of servers and their architecture and configuration may be increased based on usage, demand, and capacity requirements for the machine 30.

Figure 15:
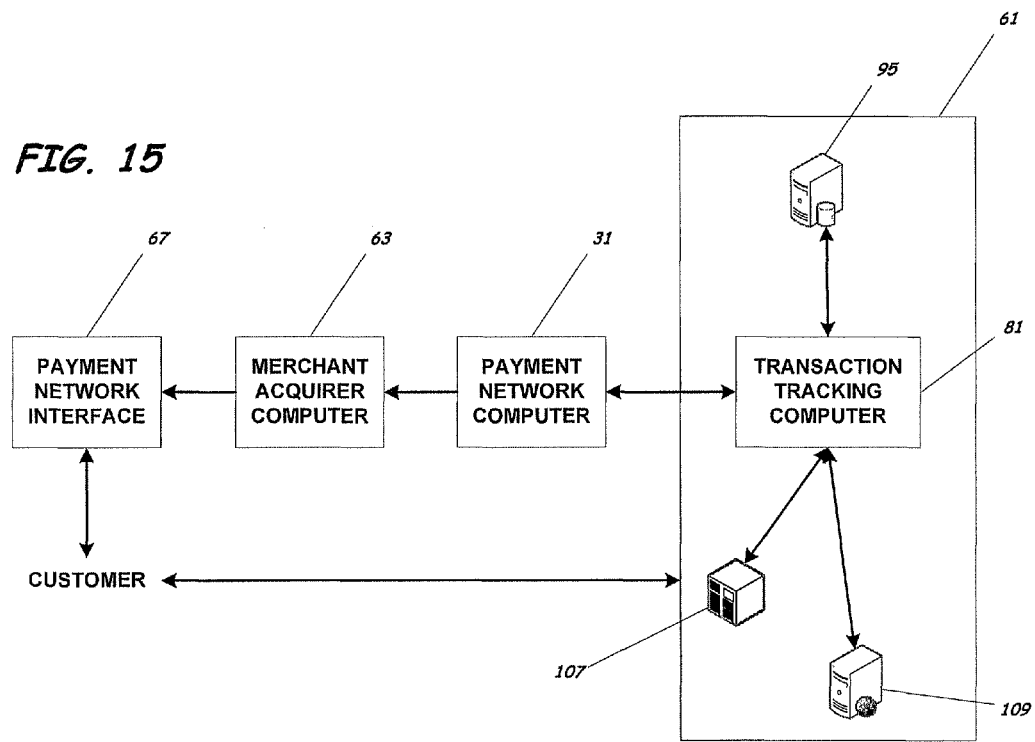
FIG. 15 is a schematic diagram of a general system architecture of a machine for facilitating electronic inventory management of serialized products through messaging over a financial services electronic payment network according to an embodiment of the present invention.

As shown in FIGS. 1 and 15, the transaction-tracking computer 81 connects to a database server 95, telecommunications interface 107 and web server 109.

The database server 95 can be used to store product, merchant, and transaction information in separate records, tables, or columns in an associated database, which may be received from the financial services electronic payment network 33. As is understood in the art, the database server 95 includes a processor directing data from a bus into the database memory, which can be e.g., a hard drive, optical storage or the like, and computer software that provides each of the plurality of issuer component computers (not shown), including the transaction tracking computer 81, access the data therein.

Figure 13:
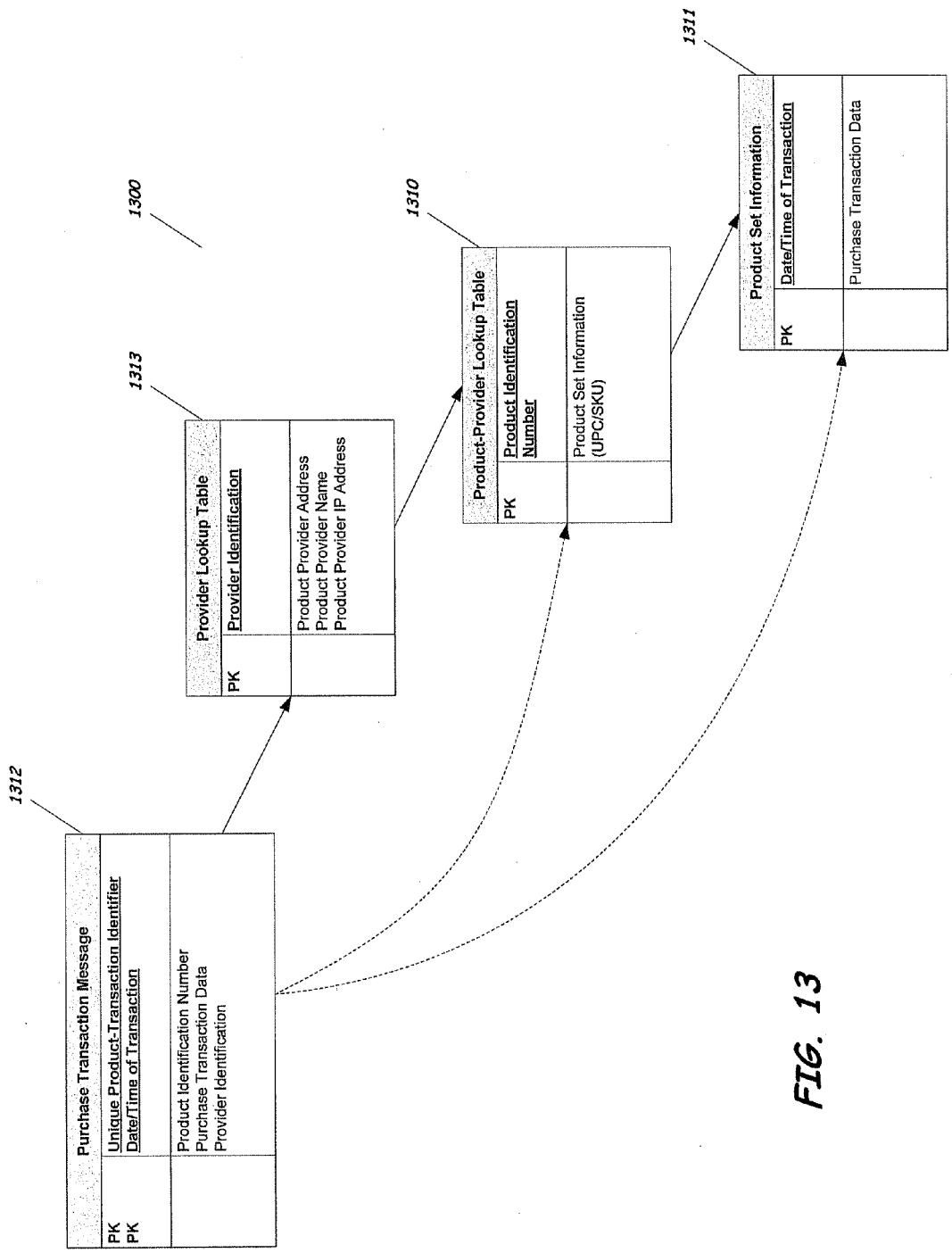
FIG. 13 is a schematic diagram of a database and database tables of a machine for facilitating the electronic inventory management of serialized products through messaging over an existing financial services electronic payment network and receiving purchase transaction data for each of a plurality of product sets, the computer program product performing the steps of according to an embodiment of the present invention.

FIG. 13 shows an exemplary database structure for product, transaction, and merchant data received by the transaction-tracking computer, and available to be stored in database server 95, though one skilled in the art will appreciate other database structures are possible and are included within the scope of the invention. Database 1300, for example, includes product provider lookup table 1310, product set information 1311, purchase transaction message table 1312, and provider lookup table 1313. Purchase transaction message table 1312 represents the contents of a purchase transaction message received by the transaction tracking computer and includes columns, i.e., fields for data entry, such as, for example, the unique product-transaction identifier, the provider identification, the product identification number and the purchase transaction data. The product provider lookup table 1310 includes columns such as, e.g., product identification number, and product identification code (UPC, SKU, product name). The product set table 1311 includes columns for e.g., date/time of transaction and any of the provider product data as included in the purchase transaction message. Provider lookup table 1313 includes columns such as, e.g., the provider identification, the product provider name, the product provider address, the product provider IP address. As one skilled in the art will understand, the purchase transaction message table 1312 can be used to store top level information about the transaction and point to a provider, while the provider look-up table 1313 can store provider information related to the top level message, the product-provider table 1310 can contain all of the product identification numbers associated with the provider identified in the provider table 1313, and the product set information table 1311 can store all of the data related to each one of the product identification numbers, e.g., sales volume, retailer sales statistics, date and time of purchase behavior, product delivery schedule, delivery throughput, real-time sales data, customer trends, a product name, a product quantity, how many of an item are in stock, a stock status, when additional stock will become available or if the product is overstocked, and a ship date, estimated date for product shipping, behavior including demand trends and product shortages, and any other data relevant to product manufacturing or distribution. One skilled in the art would also appreciate that the database tables described herein are not limited to any single flat table but may also be implemented using multiple tables or using a multidimensional or OLAP structure or methodologies. As one skilled in the art will appreciate, each of these tables may include other dependent tables for each of the columns, e.g., the provider address column could be implemented as a table with fields for street number, street name, city, state, and zip code. Moreover, database 1300 may include fewer or more data tables and columns depending upon the implementation of the particular embodiment of the invention. Those skilled in the art will understand and recognize that multiple order codes, and a customers' personal information (if the transaction is completed with a separate customer credit card) can also be included in the database tables and columns, and that database server can be implemented as a single computer, server, plurality of computers or servers, or as separate component of the transaction tracking computer 81.

Figure 14:
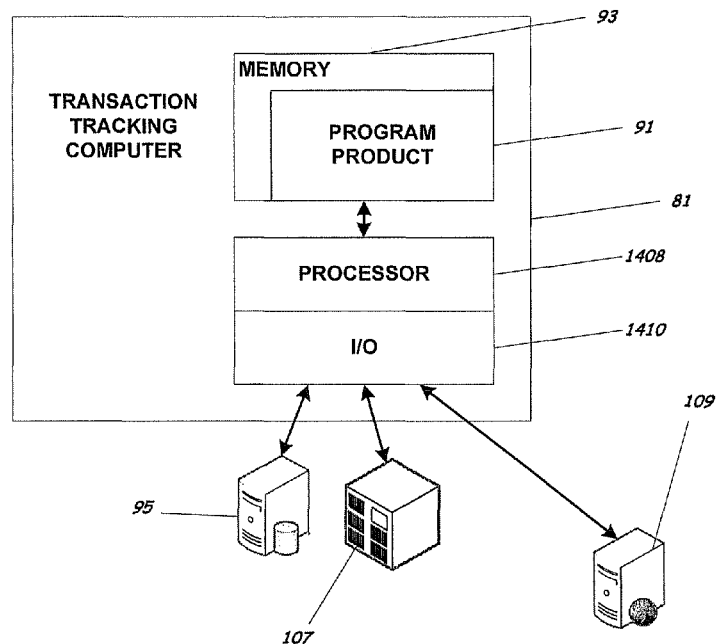
FIG. 14 is a schematic block diagram of a transaction tracking computer according to an embodiment of the invention.

As shown in FIGS. 1 and 14, telecommunications interface 107 allows a product apparatus 35, product provider 91, or a merchant (not shown) to connect to the issuer processor computer using a telephone line, or the like, and may be a standard telephone network device such as a PBX. As one skilled in the art will appreciate, web server 109 provides the payment network, merchants, product providers, and networked computers access to the issuer processor computer network, and is used to manage computer traffic to and from the issuer processor computer 61. As such, web server 109 is configured with processors, memory, and I/O devices to allow efficient exchange of data between the transaction tracking computer 81, its related components, the financial services electronic payment network 33, product provider 91, and product apparatus 35 to facilitate the web functions thereof.

Transaction tracking computer 81 can be configured as a computer, a server, or a system of distributed computers or servers that at least include memory 93, program product 91, processor 508, input/output device and ("I/O") 1410, as shown in FIG. 14. Transaction tracking computer I/O device 1410 connects the transaction-tracking computer 81 to issuer processor computer 61, database server 95, telecommunications interface 107, and web server 109, to thereby allow transaction-tracking computer 81 to send and receive product transaction inventory data. I/O device 1410 can be any I/O device including, but not limited to a network card/controller connected by a PCI bus to the motherboard, or hardware built into the motherboard of the transaction tracking computer 81 to connect same to the network.

As can be seen, the I/O device is connected to the processor 1408. Processor 1408 is the "brains" of the transaction-tracking computer 81, and as such executes program product 91 and works in conjunction with the I/O device 1410 to direct data to memory 93 and to send data from memory 93 to the database server 95, telecommunications interface 107, and web server 109. Processor 1408 can be any commercially available processor, or plurality of processors, adapted for use for the transaction tracking computer 81, e.g., Intel® Xeon® multicore processors, Intel® micro-architecture Nehalem, AMD Opteron™ multicore processors, etc. As one skilled in the art will appreciate, processor 1408 may also include components that allow the transaction tracking computer 81 to be connected to a display [not shown] and keyboard that would allow a user to directly access the processor 1408 and memory.

Memory 93 stores instructions for execution on the processor 1408, and consists of both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, although memory 93 is depicted on, e.g., the motherboard of the transaction-tracking computer 81, memory 93 may also be a separate component or device, e.g., FLASH memory, connected to the transaction-tracking computer 81. Memory 93 may also store applications that various workstations can access and run on the transaction-tracking computer 81. Importantly, memory 93 stores the program product 91 of the instant invention. As one skilled in the art will understand, the program product 91, along with one or more databases/tables/fields/records can be stored either in memory 93 or in separate memory associated, for example, with a database server 95, positioned in communication with the transaction tracking computer 81, e.g., as shown in FIG. 13.

Figure 12:
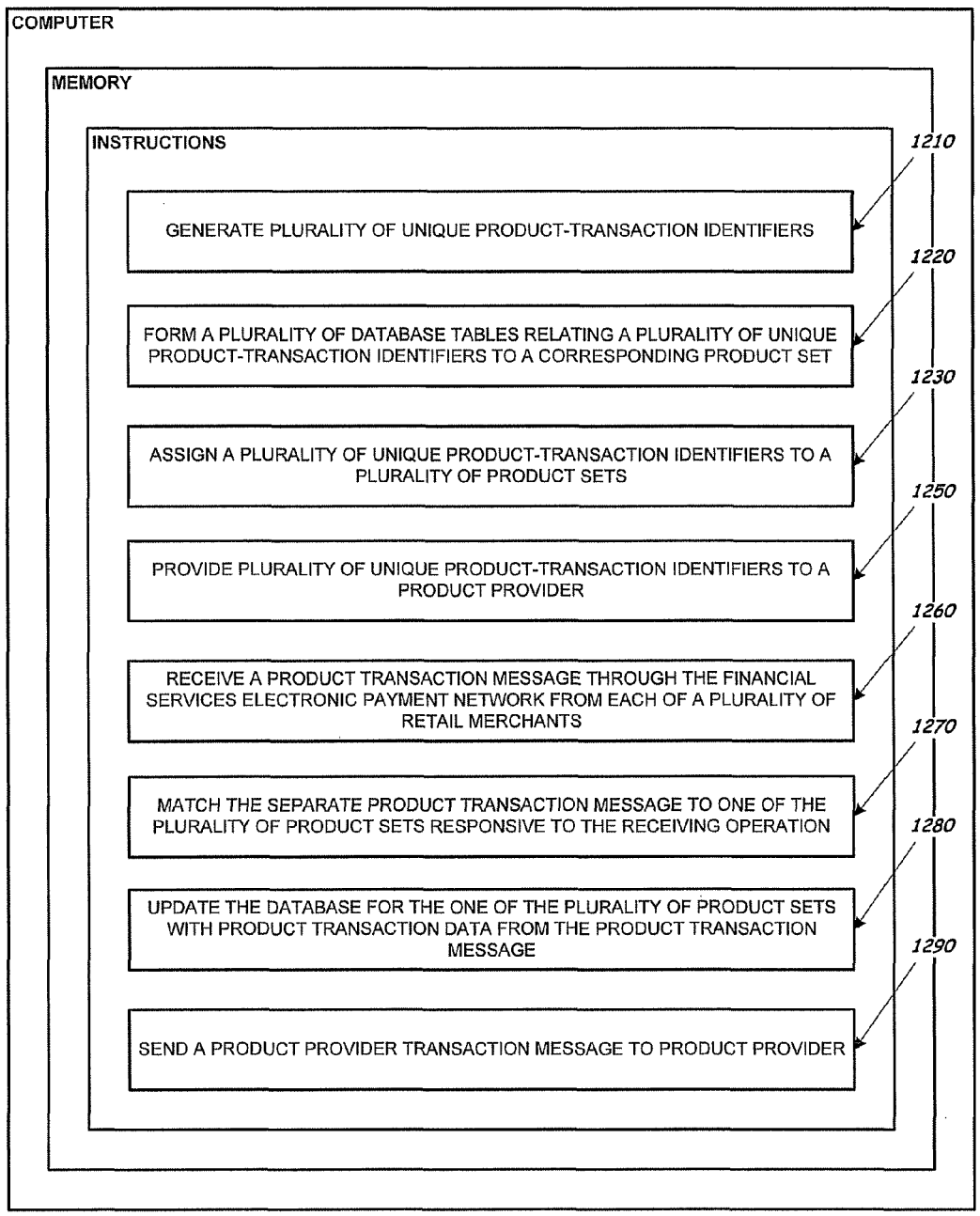
FIG. 12 provides a schematic diagram of an electronic inventory management product stored in a tangible computer readable medium and comprising a set of executable instructions that facilitate electronic inventory management of goods, services, or goods and services collectively through messaging over an existing financial services electronic payment network.

The electronic inventory management program product 91 can be configured to process the received purchase transaction message and purchase transaction data and is described in more detail in reference to FIG. 12. The electronic order entry program product 91 can include a set of instructions that, when executed, for example, by the transaction tracking computer (computer or server, etc.) 81, cause the transaction tracking computer 81 to perform various operations to include generating a plurality of universal product-transaction identifiers using a common issuer identifier number ("IIN") (Block 1210), forming a plurality of product identification lookup tables in the database (Block 1220), assigning the plurality of universal product-transaction identifiers to a plurality of product sets (Block 1230), providing the plurality of universal product-transaction identifiers to the product provider for placement on respective associated products (Block 1250), receiving a purchase transaction message through the financial services electronic payment network from each of a plurality of retail merchants (Block 1260), matching a separate purchase transaction message to one of the plurality of product sets (Block 1270), updating a database for the one of the plurality of product sets with the corresponding purchase transaction data (Block 1280), and sending a product provider transaction message to a product provider (Block 1290).

The transaction tracking computer 81, or alternatively the issuer processor computer 61, can also include at least portions of an electronic inventory management program product 91 loaded or otherwise stored in memory associated therewith. Note, the program product 91 can be in the form of microcode, programs, routines, and symbolic languages that provide a specific set for sets of ordered operations that control the functioning of the hardware and direct its operation, as known and understood by those skilled in the art. Note also, the program product 91, according to an embodiment of the present invention, need not reside in its entirety in volatile memory, but can be selectively loaded, as necessary, according to various methodologies as known and understood by those skilled in the art.

According to the exemplary embodiments of the present invention, the electronic inventory management program product 91 can include a set of instructions that, when executed, for example, by the transaction tracking computer or server, etc. 81, cause the transaction tracking computer 81 to perform various operations to include receiving a purchase transaction message from a POS terminal 67 through the financial services electronic payment network 33 and the issuer processor computer 61 responsive to a user interfacing the universal product-transaction identifier 41 of a selected one of the products 31 with POS terminal 67, i.e., by swiping the magnetic stripe, placing an RFID tag within range of a reader, or scanning the barcode if appropriate software is preloaded in the POS terminal 67 or other controlling portion of the merchant POS apparatus. The purchase transaction message can include at least a portion of the universal product-transaction identifier 41 assigned to the selected product 31 along with other merchant POS identifying and transaction related data.

If the POS terminal 67 supports partial message authorization messaging, the message can include a flag indicating a capability of the POS terminal 67 to support partial-authorization messaging. That is, during checkout involving a purchase of, for example, Orange 32 oz supplied by Soft Drink Company X, according to such embodiment of the present invention, a purchase transaction message is sent over the payment network 33 with data including the 4000 . . . 02 identifier and the partial auth flag. Partial-authorization approval data is sent to the POS terminal 67 in response to receiving the purchase transaction message. The partial authorization approval data can include data indicating a partial authorization approval balance, typically in an amount of zero dollars, to indicate to the merchant via the POS terminal 67, a requirement to tender funds in full from another source (cash, check, credit card, etc.).

The operations can also include receiving from the respective POS terminal 67, a second payment message defining a purchase acknowledgment that the POS terminal 67, or a merchant associated therewith, received from a purchasing customer sufficient monetary funds to purchase the respective product 31. In case of a failure to pay, in response to a cancellation initiated by the merchant, the transaction reverses and the indication of the sale of the product 31 associated with the specific UPC or SKU 49 is deleted/expunged.

The operations can further include storing purchase transaction data associated with the respective product 31 being purchased for use by a provider 97 of the product 31 being purchased. According to one configuration of many different types of configurations known to those skilled in the art of computer systems, one or more look-up tables/lists/databases of product providers 97, particular products 31 and their respective UPCs or SKUs 49, and associated universal product-transaction identifiers 41 or product identifier numbers 53 (i.e., the "card" number portion which translates to the assigned UPCs or SKUs, and thus, the product being purchased), can be stored either in memory 93 or in separate memory, for example, associated with a database server 95 positioned in communication with the transaction tracking computer 81. The transaction tracking computer 81 can use the universal product-transaction identifier 41 (e.g., 16 digit card number) and/or product identifier number 53 to access the tables associated with the transaction message, and to update various relevant tables with the received purchase transaction message data into usable sales, inventory, and other purchase transaction data for the associated product 31 for the respective product provider 97. This data can also be stored in a database associated with memory 93, or in memory associated with a database server 95, in one or more tables or databases which can include columns or fields, such as, for example: product name, UPC or SKU 49, universal product-transaction identifier 41, a merchant category code, merchant identification number (which corresponds to a merchant location), terminal identification number, and time-of-day the product 31 was purchased, etc.

As one skilled in the art will appreciate, the program product can be written to parse the product transaction message and to store relevant portions in one or more tables, and then to query tables that contain the relevant data for each product provider and assembles a product provider transaction message from the database tables. Since each product provider could request different provider transaction message, the provider tables and fields could be static, i.e., not change for each provider, but each transaction message could be programmed to be unique or custom to the product provider, i.e., contain information important or relevant to a particular product provider. These operations could also include making at least some of the stored purchase transaction data available to the product provider 97 through one or more external communications networks 101 not associated with the financial services electronic payment network 33, or alternatively, compiling such data, real-time, for transmission to the product provider 97. Beneficially, subscribing product providers 97 could access near real-time sales data to find out, not only how much overall product 31 has been sold, but at the UPC/SKU level, as well as the date and time of the purchase behavior. Such data across multiple merchants, especially the smaller merchants, can be invaluable to the product providers 97 for product production and stock planning. In operation, according to an embodiment of the present the product provider transaction message could include data that would allow Soft Drink Company X to know with certainty that an Orange 32 oz soda was sold at the Merchant Gas Station Y located on 100 Main St on October 1 at 10:02 PM.

In addition since the product providers 97 or their distributor deliver their respective products 31 on a regular basis, as noted previously, the distributor can also be programmed to receive the product provider transaction message so that a delivery truck can arrive and know in advance what product 31 is needed. Compared to the current process where the distributors load up the truck with all UPCs/SKUs, and the delivery driver enters into each the merchant's store on his/her delivery route, takes an inventory of existing product 31 and then returns to the truck to then extract the necessary product 31 to replenish the inventory levels, embodiment of the present invention provide a substantial improvement in efficiency.

FIGS. 7-11 provide high-level flow diagrams illustrating method steps and operations for facilitating electronic inventory management (including tracking) of goods, services, or combinations thereof (collectively "product" or "products"), through messaging over a financial services electronic payment network 33, such as, for example, the Visa®, MasterCard®, American Express®, or Discover® network, which is currently deployed to receive and process electronic payments through POS terminals, such as, for example, POS terminal 67, located at a merchant site. Note, a merchant as identified herein, includes a merchant of both products (e.g., retail or wholesale stores or shops)' and services (e.g., providers of professional and non-professional services).

Figure 7:
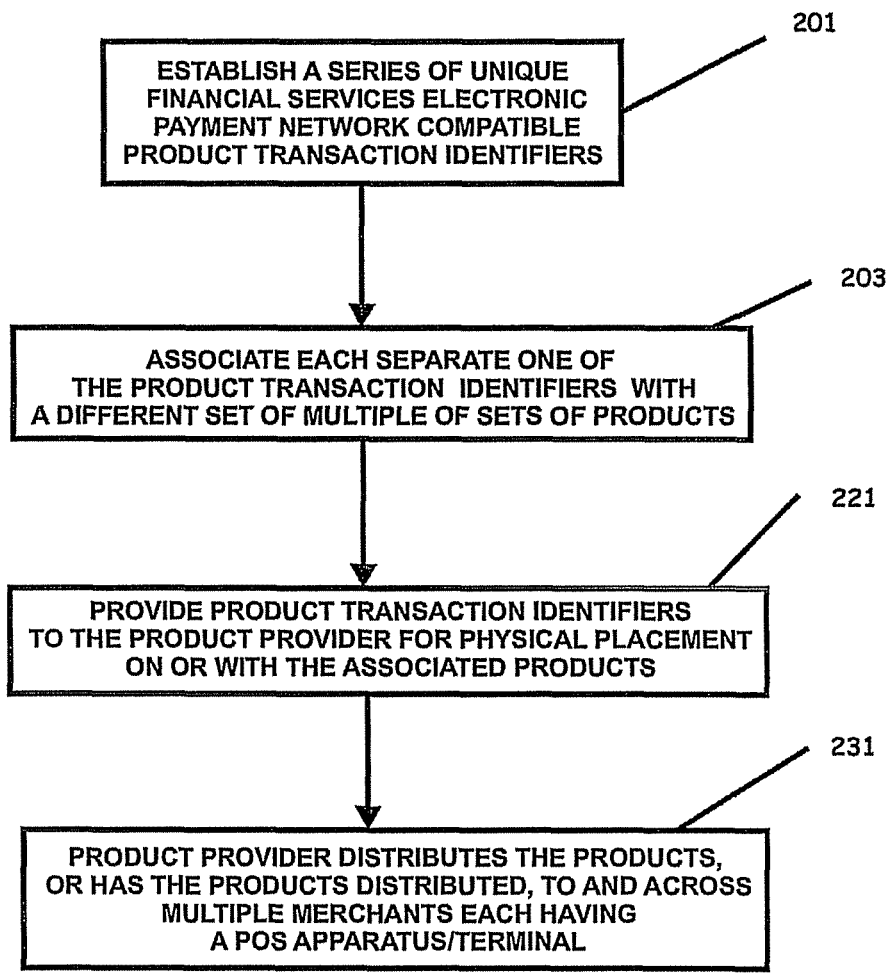
FIG. 7 is a schematic flow diagram illustrating steps/operations for fielding payment network compatible product apparatus according to an embodiment of the present invention.

As shown in FIG. 7, according to the exemplary embodiment of the present invention, a "payment card number" issuer affiliated with a product provider 97 (e.g., manufacturer, distributor, etc.) offering the products 31, or alternatively, the product provider 97, itself, obtains, generates, or otherwise establishes a series of, e.g., numeric, unique financial services electronic payment network compatible universal product-transaction identifiers 41 (block 201), and assigns or otherwise associates each separate one of the universal product-transaction identifiers 41 with a different set 43 of multiple of sets 45 of products 31 (block 203), such that each product 31 within each single set 43 of the multiple sets 45 of products 31, for example, associated with a single product provider 97, is characterized by being a same type, size, and quantity as each other product 31 in the respective same set 43 of products 31, and such that each product 31 within each set 43 of products 31 are different from each product 31 in any of the other sets 43 of the multiple sets 45 of products 31 by a feature such as type, size, quantity, and/or delivery mode, etc., as perhaps best shown in FIG. 4.

According to one configuration, the universal product-transaction identifiers 41 generated for each separate product provider 97 are done so on a different common, e.g., financial, transaction issuer identifier number IIN 51 for each product provider 97. The common IIN 51, which is included in the universal product-transaction identifier 41, is typically used by the payment network 33 to identify the issuer, but in this exemplary configuration, can also be used by the issuer to identify the product provider 97. In other words, the IIN identifies both the issuer and a particular product provider associated with the issuer. As one skilled in the art will appreciate, other configurations, such as one where the IIN identifies the issuer and the purchase transaction message includes other data to identify the product provider, may also be used in this system and are within the scope of this disclosure.

Note, the singular term product provider 97 includes reference to not only a single individual entity, but can also include reference to a separate division, subdivision, section, product line, or other type of grouping, as desired. As such, it should be understood that different IINs 51 need not be assigned to product providers 97 in the form of different legal entities, but can be assigned to a single legal entity, and that each such entity division, subdivision, section, product line, or other grouping, can be considered a separate product provider 97, whether or not it would be so considered in the "legal" sense. Note also, although indicated as numeric, if supported by the payment network 33, each of the "unique" universal product-transaction identifiers 41 can alternatively be differentiated from each other identifier 41 by containing therein a distinct series of letters, numbers and letters, code scheme, and arrangement of characters selected for such purpose. And, although applicable to product providers 97 having only a single product, most product providers 97 provide multiple different types of products 31 or, at least, multiple different versions of a same or core product 31, which typically have different sales characteristics and may appeal to different types of customers. Thus, each "different" product 31, whether differentiated by type (e.g., orange vs. grape) or by some other characteristic (e.g., 12 oz. vs. 32 oz.) should be assigned a product identification number 53 which is different across products 31 affiliated with the single product provider 97.

As further shown in FIG. 7, if responsible for generating the universal product-transaction identifiers 41, the affiliated issuer provides the generated universal product-transaction identifiers 41 to the product provider 97 for physical placement on or with the associated products 31 (block 221). Each of the products 31 is either packaged in a container medium 37 to form a product apparatus 35 (see, e.g., FIG. 2), or is assigned a separate container medium 37', for example, in the form of a product identification purchase ticket or slip representing the product 31 (see, e.g., FIG. 3), or both. The container medium 37, 37', carries or otherwise contains transaction identifier storage medium 39 for storing the respective associated universal product-transaction identifier 41. Each transaction identifier storage medium 39 is configured to interface with the POS terminal 67, which is positioned to receive the respective universal product-transaction identifier 41 for transmission over the existing financial services electronic payment network 33.

Each product 31 is also assigned a product identifier (e.g., UPC or SKU 49), which can also be carried or otherwise contained by the container medium 37, 37', typically using a paste-on label, to allow electronic product identification using the bar-code scanner 71 of the POS terminal 67. The universal product-transaction identifiers 41 selected for storage in the storage medium 39 of the particular product 31, are done so, according to a preferred configuration, such that each product 31 within each single set 43 of the plurality of sets 45 of products 31, for each same product provider 97, have the same UPC/SKU 49 associated therewith that is different from the UPC/SKU 49 associated with each product 31 in any of the other sets 43 of products 31.

As further shown in FIG. 7, after the assigned universal product-transaction identifier 41 is loaded in the storage medium 39, and the UPC or SKU 49 is either labeled or embossed on the container medium 37, 37', typically by the product manufacturer, the product provider 97 distributes the products 31, or has the products 31 distributed, to multiple, e.g., retail merchants each having a POS apparatus including a POS terminal 67 (block 231). According to an exemplary embodiment of the present invention, each of the retail merchants have a POS apparatus/terminal 67 that supports partial-authorization messaging over the financial services electronic payment network 33 in a POS environment.

Figure 8:
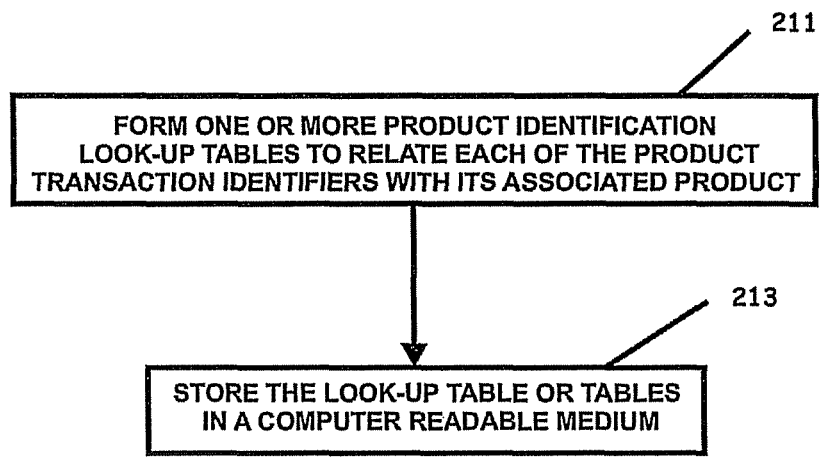
FIG. 8 is a schematic flow diagram illustrating steps/operations for associating universal product-transaction identifier with product sets according to an embodiment of the present invention.

As shown in FIG. 8, either as part of the step/operation of associating each different universal product-transaction identifier 41 with a different set 43 of products 31, or as a separate step/operation, one or more of the universal product-transaction identifiers 41 are linked with its associated product 31 for either a single product provider 97, or for multiple providers 97, with the corresponding product provider 97 (block 211), and are responsively stored in a computer readable medium such as, for example, memory 93 of the transaction tracking computer 81 or the memory associated with database server 95 (block 213).

Figure 9:
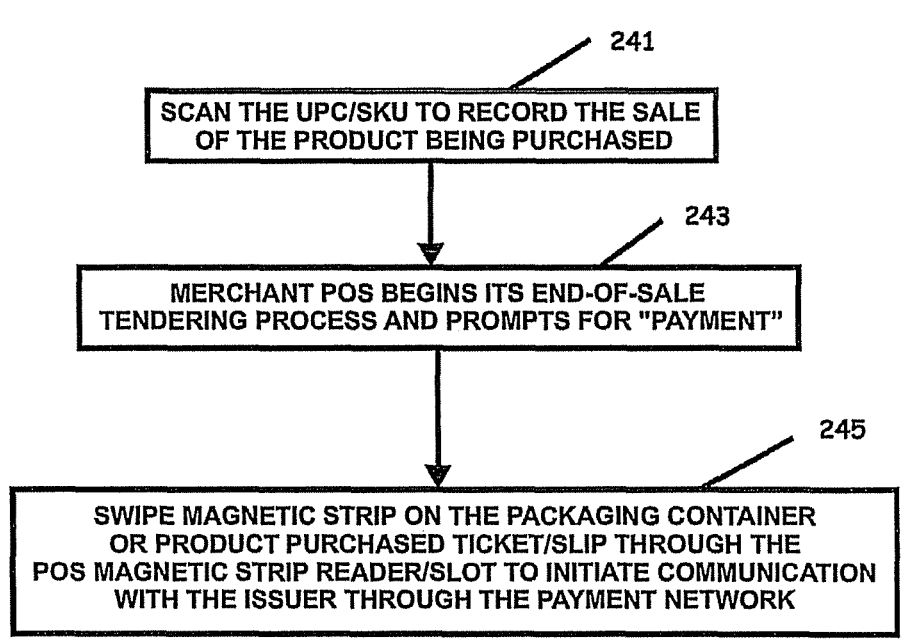
FIG. 9 is a schematic flow diagram illustrating customer/merchant action for initiating purchase transaction tracking according to an embodiment of the present invention.

As shown in FIG. 9, to purchase a product 31, a customer typically brings the product 31 to the POS checkout counter. The merchant scans the label displaying the product identifier, e.g., 12 digit UPC/SKU 49, to record the sale of the product 31 (block 241). At the end of the purchase process, the merchant POS apparatus/terminal 67 begins its end-of-sale tendering process and prompts for "payment" (block 243). In embodiments where the storage medium 39 is in the form of a magnetic stripe, the first "payment" presented should be a "swipe" of the magnetic stripe for the product 31 being purchased, through the magnetic stripe reader/slot 73 of the POS apparatus/terminal 67 (block 245), which begins communication with the issuer through the payment network 33. In the embodiments of the invention where the storage medium is in the form of an RFID tag, the container medium 37, 37' need only be placed in close proximity to the tag reader portion of the POS terminal 67. Moreover, in the embodiments of the invention where the storage medium is in the form of a barcode, the barcode scanner 71 can be used. Moreover, rather than include a separate storage medium 39, the software controlling the barcode reading and/or purchase recording functions of the merchant POS apparatus/terminal 67 can be modified so that a single scan of the embossed image or barcode label carrying the UPC/SKU 49 not only records the transaction locally at the merchant level, but reads a local look-up table to convert the UPC/SKU 49 into the universal product-transaction identifier 41 associated with the product 31 being purchased. In addition or alternatively, the merchant POS apparatus/terminal 97 can include transaction identifier translation program product (not shown) configured to cause the merchant POS apparatus processor (not shown) to access the look-up table of universal product-transaction identifiers 41 and associated UPCs/SKUs 49, and to send the universal product-transaction identifier 41 associated with the product 31 being purchased through the existing financial services electronic payment network 33 responsive to the merchant POS apparatus/terminal 97 reading or otherwise receiving the UPC/SKU 49 of the product 31 being purchased. Note, in order to simplify the local merchant look-up table, the product identifier number 53 portion of the unique universal product-transaction identifier 41 can be selected to allow both product identification and product provider identification at the issuer level.

Regardless of the configuration, the merchant POS apparatus/terminal 67 sends a purchase transaction message sent through the financial services electronic payment network 33, which can use the IIN 51 of the purchase transaction identifier 41 associated with the product 31 being purchased to identify the appropriate issuer, and to route the purchase transaction message thereto via the issuer processor computer 61 and/or transaction tracking computer 81.

Figure 10:
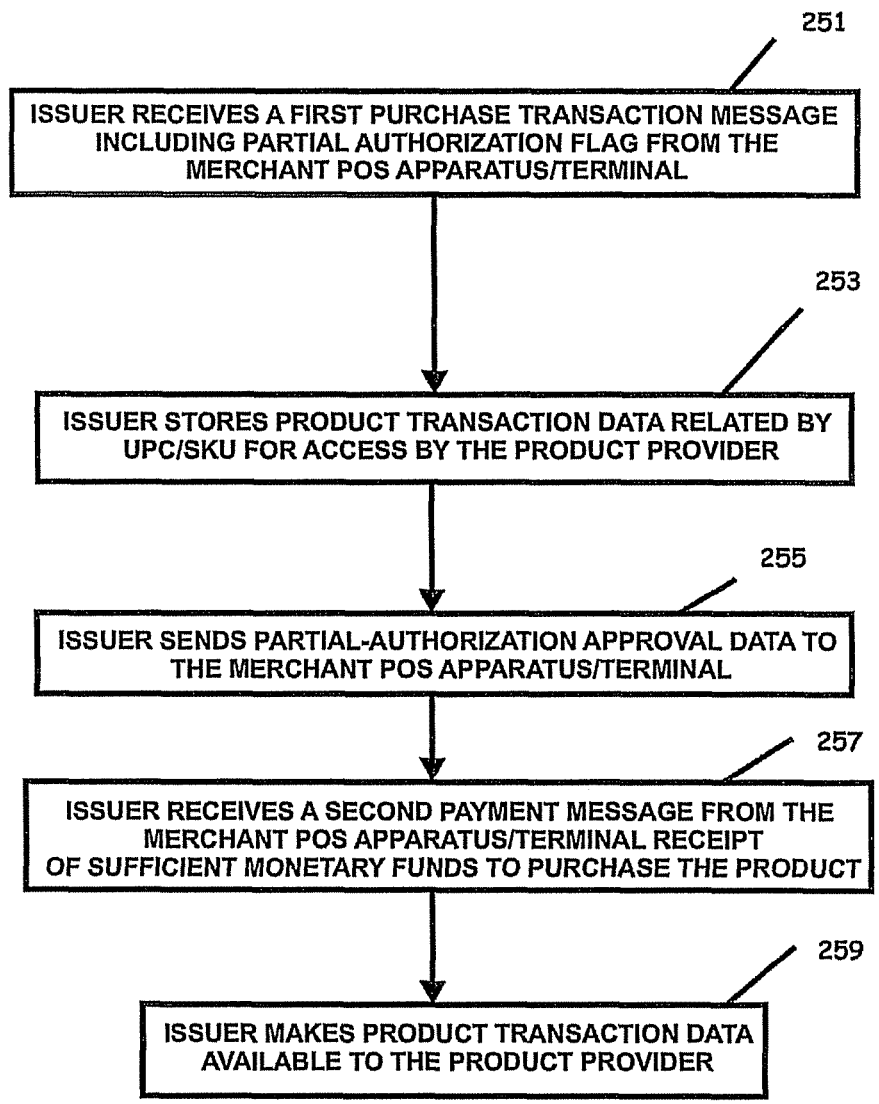
FIG. 10 is a schematic flow diagram illustrating steps/operations for receiving, processing, and providing purchase transaction data according to an embodiment of the present invention.

As shown in FIG. 10, the issuer receives the purchase transaction message (block 251), and stores purchase transaction data related by UPC/SKU 49 for access by the product provider 97 that supplied the respective product 31 being purchased (block 253). Note, although the individual purchase transaction data at the time of storage generally reflects data for the specific product 31 being purchased for the specific product provider 97, the stored purchase transaction data can be compiled for each separate product provider 97 or multiple providers 97, and across multiple retail merchants selling multiple products 31 associated with the respective product provider or providers 97. The stored purchase transaction data can include, not only a purchase indication for the specific product 31 being purchased, but also the date purchased, time-of-day purchased, and product purchase location indicia.

In a partial authorization messaging environment, the purchase transaction message is a first message, which, along with the purchase transaction identifier 41 associated with the respective product 31 being purchased, includes a flag indicating a capability of the merchant POS apparatus/terminal 67 to support partial-authorization messaging, and generally the following data items: merchant category code, merchant identification number, merchant identification number, terminal identification number, and time-of-day. As such, the steps/operations can also include the issuer sending partial-authorization approval data to the respective merchant POS apparatus/terminal 67 in response to receiving the first purchase transaction message (block 255), and the issuer receiving a second payment message from the respective merchant POS apparatus/terminal 67 acknowledging that the merchant POS apparatus/terminal 67 or a merchant associated therewith received sufficient monetary funds to purchase the respective product 31 (block 257). In a preferred configuration, the partial authorization approval data includes data indicating a partial authorization approval balance of zero dollars that can function as prompt to do the merchant/customer to tender funds in full from another source.

The steps/operations can further include making the purchase transaction data available to the product provider 97 (block 259), for example, over an external communications network 101. The data can be either immediately available, or a delay can be incorporated to allow the respective merchants to cancel the purchase transaction if either sufficient funds are not received or if the product 31 is returned/refunded. Also or alternatively, transaction reports can be generated to provide near real time or slight-time-delayed purchase transaction data to allow real-time inventory manufacturing and delivery management of the products 31.

Figure 11:
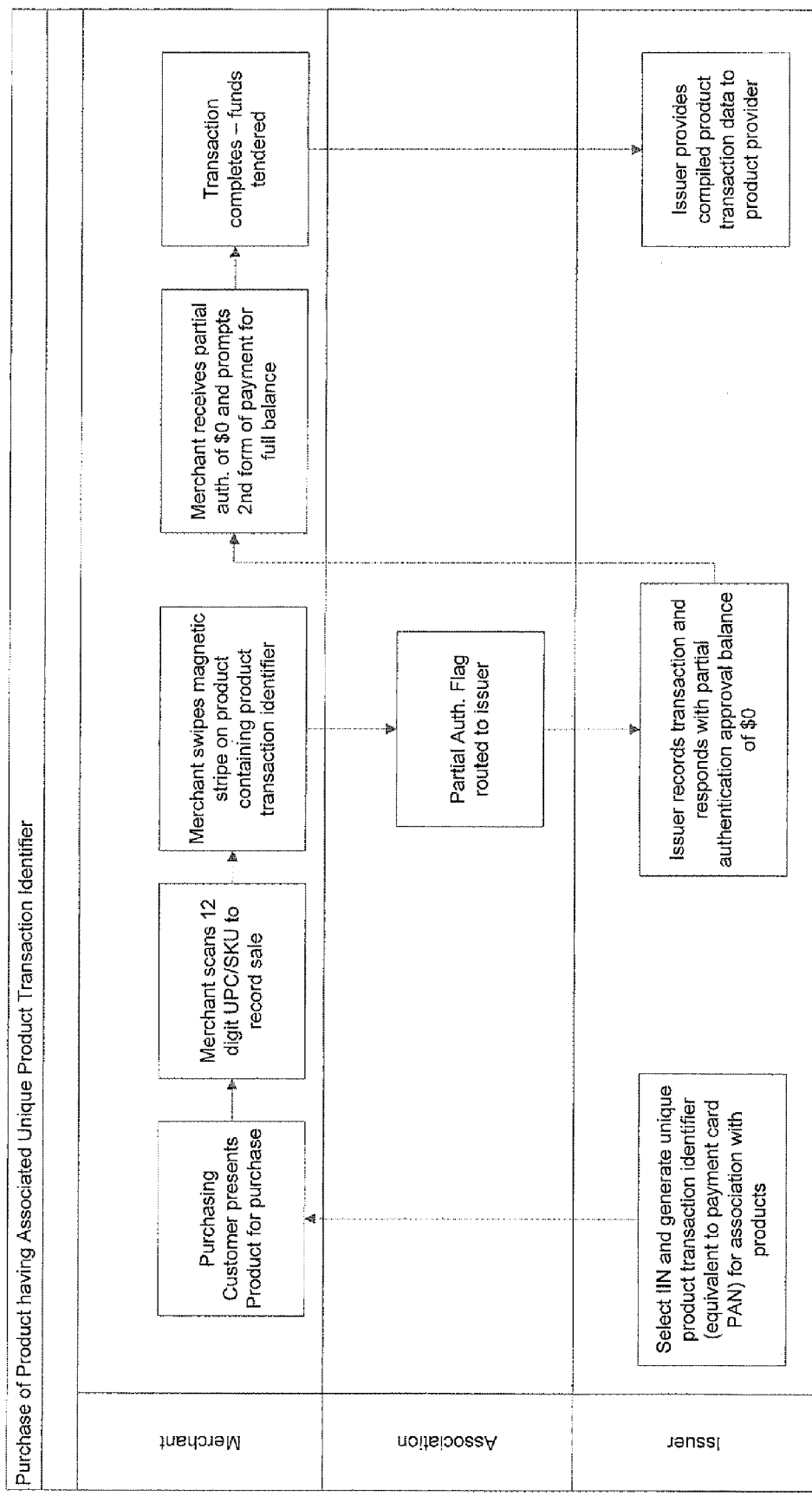
FIG. 11 is a schematic flow diagram summarizing various steps/operations for facilitating electronic inventory management of products through messaging over a financial services electronic payment network according to an embodiment of the present invention.

FIG. 11 illustrates an exemplary scenario that summarizes many of the steps/operations of the process described in FIGS. 7-10, whereby the purchase transaction is successful. This illustration includes the transfer of the purchase transaction identifiers 41, and includes an exemplary dataflow between the merchant and the issuer.

Note, although the operations of receiving and storing were discussed with respect to a single product purchase, the operation of receiving a purchase transaction message can include receiving a plurality of purchase transaction messages from a plurality of retail merchant apparatus/terminals 67 each positioned across separate and spaced apart retail merchant sites. Additionally, the stored purchase transaction data can include purchase transaction data for each of the products 31 supplied to each of the retail merchants by the product provider 97 and separately purchased therefrom.

Moreover, while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that embodiments of the present invention apply equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the program product 91 and the computer implemented method steps/operations, described above.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although reference has been made to merchant POS apparatus/terminals, it should be understood that no actual sale is required. Thus, use of non-merchant apparatus/terminals having access to one or more of the existing financial services electronic payment networks, is within the scope of the present invention.

The invention claimed is:

1. A computer associated with a first financial institution to define a financial institution computer to facilitate electronic inventory management of a plurality of products provided by a plurality of different product providers, the financial institution computer comprising:
   one or more processors configured to process data associated with the first financial institution;
   one or more input/output units configured to communicate with a communication network and an electronic financial payment network, the electronic financial payment network adapted to identify a plurality of issuers of a plurality of bank identifier numbers (BINs) and further adapted to set transaction rules to settle funds between parties of transactions, the plurality of issuers of the plurality of BINs configured to include the first financial institution;
   non-transitory memory encoded with one or more computer programs operable by the one or more processors and configured to facilitate electronic inventory management of a plurality of different products provided by each of the plurality of different product providers, each of the plurality of different products of each of the plurality of different product providers adapted to have an associated apparatus to thereby define a plurality of product apparatuses, so that during operations of the one or more computer programs, the one or more processors operate to perform the following steps:
      generating a plurality of universal product transaction identifiers adapted to be positioned on the plurality of product apparatuses and configured to facilitate inventory management of the plurality of different products of each of the plurality of different product providers, each of the plurality of universal product transaction identifiers configured to include one of the plurality of BINs issued by the first financial institution, each of the plurality of universal product transaction identifiers further configured to include one of a plurality of product identifiers, the one of the plurality of BINs configured to be compatible with the electronic financial payment network to thereby enable the electronic financial payment network to identify the first financial institution as the issuer of each of the plurality of universal product transaction identifiers;
      communicating, via the communication network, the plurality of universal product transaction identifiers to the plurality of different product providers so that the plurality of universal product transaction identifiers are adapted to be positioned on the plurality of product apparatuses, each of the plurality of different product providers adapted to provide the respective plurality of different products to a plurality of merchants, each of the plurality of different product providers also adapted to determine a count of the respective plurality of different products;
      correlating the plurality of product identifiers of the plurality of universal product transaction identifiers with the plurality of different products of one or more of the plurality of different product providers, the correlation responsive to receipt, via the communication network, of product information from the one or more of the plurality of different product providers;
      determining receipt of one or more first transaction messages having one or more of the plurality of universal product transaction identifiers and a flag indicating a capability of one or more of a plurality of merchant point-of-sale (POS) terminals to support partial-authorization messaging, the one or more of the plurality of merchant POS terminals positioned in communication with one or more of a plurality of merchant acquirer computers and associated with one of the plurality of merchants, the one or more first transaction messages being sent through the electronic financial payment network from the one or more of the plurality of merchant POS terminals responsive to one or more purchase requests of one or more of the plurality of different products of one of the plurality of different product providers when the one or more of the plurality of merchant POS terminals interface with one or more of the plurality of product apparatuses to retrieve one or more of the plurality of universal product transaction identifiers associated with the one or more of the plurality of different products;
      sending, via the electronic financial payment network responsive to the determining receipt of the one or more first transaction messages, partial-authorization approval data to the one or more of the plurality of merchant POS terminals to indicate a requirement to tender funds to complete the one or more purchase requests of the one or more of the plurality of different products to thereby use the partial-authorization messaging to facilitate communication of product inventory data using the electronic financial payment network;
      determining receipt of one or more second transaction messages sent through the electronic financial payment network from the one or more of the plurality of merchant POS terminals, the one or more second transaction messages indicating a purchase acknowledgement and being responsive to the one or more of the plurality of merchant POS terminals receiving authorization of a method of payment from a second financial institution that issued a transaction card associated with the method of payment to thereby indicate a purchase of the one or more of the plurality of different products associated with the one or more purchase requests; and notifying, responsive to the determining receipt of the one or more second transaction messages, the one of the plurality of different product providers of a plurality of product provider transaction messages, the plurality of product provider transaction messages configured to include a transaction time and a transaction date of the one or more of the plurality of different products purchased with one or more of the plurality of merchants, each of the plurality of product provider transaction messages further configured to indicate an effect of the purchase of the one or more of the plurality of different products associated with the one or more purchase requests on the count of the plurality of different products of the one of the plurality of different product providers.

2. The financial institution computer as defined in claim 1, wherein the purchase acknowledgement received further indicates one or more of the following data items: merchant category code, merchant identification number, terminal identification number, date purchased, time-of-day purchased, and product purchase location indicia.

3. The financial institution computer as defined in claim 1, wherein the one or more of the plurality of merchant POS terminals interface with the one or more of the plurality of product apparatuses to read the one or more of the plurality of universal transaction identifiers via one or more of the following: swiping a magnetic stripe positioned on the one or more of the plurality of product apparatuses, reading a RFID tag positioned on or in the one or more of the plurality of product apparatuses, or scanning a bar code positioned on the one or more of the plurality of product apparatuses.

4. The financial institution computer as defined in claim 1, wherein the plurality of different products of the one of the plurality of different product providers have a common BIN with the plurality of different products of another one of the plurality of different product providers.

5. The financial institution computer as defined in claim 2, wherein the plurality of product provider transaction messages further include a compiled report of the one or more of the plurality of different products based on the date purchased, the time-of-day-purchased, or the product purchase location.

* * * * *

UNITED STATES PATENT AND TRADEMARK OFFICE
CERTIFICATE OF CORRECTION

| | | |
|---|---|---|
| PATENT NO. | : 9,213,965 B1 | Page 1 of 1 |
| APPLICATION NO. | : 12/626349 | |
| DATED | : December 15, 2015 | |
| INVENTOR(S) | : Jason Brooks et al. | |

It is certified that error appears in the above-identified patent and that said Letters Patent is hereby corrected as shown below:

ON THE TITLE PAGE

On Page 5, Item (56) References Cited, Other Publications, Left Column, Line 51, the application number appears as "12/338,640" and should read --12/338,540--.

Signed and Sealed this
Twelfth Day of April, 2016

Michelle K. Lee
*Director of the United States Patent and Trademark Office*